(12) United States Patent
Aoyagi et al.

(10) Patent No.: US 12,175,794 B2
(45) Date of Patent: *Dec. 24, 2024

(54) INFORMATION PROCESSING APPARATUS, INFORMATION PROCESSING METHOD, AND INFORMATION PROCESSING PROGRAM

(71) Applicant: NEC Corporation, Tokyo (JP)

(72) Inventors: Toru Aoyagi, Tokyo (JP); Yoshiko Imanishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,212

(22) Filed: Apr. 27, 2023

(65) Prior Publication Data

US 2023/0260320 A1 Aug. 17, 2023

Related U.S. Application Data

(63) Continuation of application No. 17/260,339, filed as application No. PCT/JP2019/026494 on Jul. 3, 2019, now Pat. No. 11,670,111.

(30) Foreign Application Priority Data

Jul. 25, 2018 (JP) ................................ 2018-139374

(51) Int. Cl.
*G06V 40/16* (2022.01)
*G06V 30/413* (2022.01)
*G06V 40/40* (2022.01)

(52) U.S. Cl.
CPC .......... *G06V 40/168* (2022.01); *G06V 30/413* (2022.01); *G06V 40/171* (2022.01);
(Continued)

(58) Field of Classification Search
None
See application file for complete search history.

(56) References Cited

U.S. PATENT DOCUMENTS

| | | | |
|---|---|---|---|
| 5,683,001 A * | 11/1997 | Masuda ................. | H05K 7/183 361/829 |
| 10,255,419 B1 * | 4/2019 | Kragh ..................... | H04L 9/321 |
| 2010/0177939 A1 * | 7/2010 | Hamada ............... | G06V 40/166 382/118 |

(Continued)

FOREIGN PATENT DOCUMENTS

| CN | 104615233 A | 5/2015 |
|---|---|---|
| CN | 106529414 A | 3/2017 |

(Continued)

OTHER PUBLICATIONS

International Search Report for PCT Application No. PCT/JP2019/026494, mailed on Oct. 8, 2019.

(Continued)

*Primary Examiner* — Soo Shin

(57) ABSTRACT

This invention can readily, reliably perform identity verification and input of user information when opening an account from a terminal. An information processing apparatus includes a first feature extractor extracting a first feature from a face image of a user included in a moving image, a second feature extractor extracting a second feature from a face image of an identity verification document for authenticating the user included in the moving image, a collator collating whether the first feature and the second feature match each other, a determiner instructing the user to perform a predetermined action, and determining whether an action of the user included in the moving image corresponds to the instructed predetermined action, and a verifier verifying that the user is the person himself or herself, when the first feature and the second feature match each other and the action of the user corresponds to the instructed predetermined action.

10 Claims, 34 Drawing Sheets

(52) U.S. Cl.
CPC ............ *G06V 40/172* (2022.01); *G06V 40/40* (2022.01); *G06V 40/179* (2022.01)

(56) References Cited

U.S. PATENT DOCUMENTS

| | | | |
|---|---|---|---|
| 2010/0308108 A1* | 12/2010 | Choi | G07C 9/10 235/382 |
| 2013/0063581 A1* | 3/2013 | Komatsu | G06V 40/50 348/E7.085 |
| 2016/0277397 A1 | 9/2016 | Watanabe | |
| 2018/0061179 A1* | 3/2018 | Miri | G07F 17/3241 |
| 2019/0238533 A1* | 8/2019 | Pointner | G06F 21/566 |
| 2019/0311102 A1* | 10/2019 | Tussy | G06V 40/166 |
| 2021/0110625 A1* | 4/2021 | Kawase | G07C 9/25 |
| 2021/0264184 A1* | 8/2021 | Aoyagi | G06V 40/45 |

FOREIGN PATENT DOCUMENTS

| | | |
|---|---|---|
| JP | 2001-052142 A | 2/2001 |
| JP | 2003-317100 A | 11/2003 |
| JP | 2006-251944 A | 9/2006 |
| JP | 2014-235655 A | 12/2014 |
| JP | 2017-027492 A | 2/2017 |
| JP | 2017-049867 A | 3/2017 |
| JP | 2018-504703 A | 2/2018 |
| JP | 2018-109935 A | 7/2018 |
| WO | 2009/004916 A1 | 1/2009 |
| WO | 2013/114806 A1 | 8/2013 |

OTHER PUBLICATIONS

JP Office Action for JP Application No. 2020-532256, mailed on Sep. 5, 2023 with English Translation.
CN Official Communication for CN Application No. 201980047042.1, mailed on Feb. 12, 2024 with English Translation.
Liutao Wang et al., "Human activity recognition based on contour feature extraction on key-frame", Journal of Chongqing University of Posts and Telecommunications (Natural Science Edition), vol. 29, No. 1, pp. 98-105, Feb. 15, 2017.

* cited by examiner

FIG. 6B

Table 650:
| 651 | 652 | 653 | 654 |
|---|---|---|---|
| LICENSE EXTRACTION ALGORITHM | FACE IMAGE EXTRACTION ALGORITHM | FACE IMAGE FEATURE EXTRACTION ALGORITHM | FACE IMAGE FEATURE COLLATION ALGORITHM |

Table 660:
| 661 | 662 | 663 | 664 |
|---|---|---|---|
| LIVENESS INSTRUCTION ID | INSTRUCTION CONTENTS | INSTRUCTION FLAG | LIVENESS DETERMINATION ALGORITHM |
| LIVE01 | RIGHT WINK | | |
| LIVE02 | LEFT WINK | | |
| LIVE03 | CLOSING OF BOTH EYES | | |
| LIVE04 | TURNING FACE UPWARD | | |
| LIVE05 | INCLINING HEAD TO LEFT AND RIGHT | | |
| ... | | | |

Table 670:
| 671 | 672 | 673 |
|---|---|---|
| LICENSE TYPE | IC CHIP FORMAT | LICENSE AUTHENTIC/FAKE DETERMINATION ALGORITHM |
| ... | | |

| LIVENESS INSTRUCTION | LIVENESS RESPONSE | MATCH OR MISMATCH FLAG | LIVENESS DETERMINATION RESULT |
|---|---|---|---|
| | | | |
| | | | |
| ... | | | |

FIG. 7B

| LIVENESS INSTRUCTION | LIVENESS RESPONSE LICENSE IMAGE | MATCH OR MISMATCH FLAG | LIVENESS DETERMINATION RESULT |
|---|---|---|---|
|  |  |  |  |
|  |  |  |  |
|  |  |  |  |
| ... |  |  |  |

FIG. 15

INFORMATION PROCESSING APPARATUS, INFORMATION PROCESSING METHOD, AND INFORMATION PROCESSING PROGRAM

This application is a Continuation of U.S. application Ser. No. 17/260,339 filed on Jan. 14, 2021, which is a National Stage Entry of PCT/JP2019/10 26494 filed on Jul. 3, 2019, which claims priority from Japanese Patent Application 2018-139374 filed on Jul. 25, 2018, the contents of all of which are incorporated herein by reference, in their entirety.

TECHNICAL FIELD

The present invention relates to an information processing apparatus, an information processing method, and an information processing program.

BACKGROUND ART

In the above technical field, patent literature 1 discloses a technique of opening an account of a financial institution via a network. In patent literature 1, identity verification is performed by a match between image information read by a scanner and identity verification information input by the user. Patent literature 2 discloses an identity verification technique using collation of face images of a user, which prevents spoofing by instructing the direction of a face and blinking. Furthermore, patent literature 3 discloses an identity verification technique using a change in corneal reflection caused by movement of the direction of a face.

CITATION LIST

Patent Literature

Patent literature 1: Japanese Patent Laid-Open No. 2006-251944
Patent literature 2: Japanese Patent Laid-Open No. 2003-317100
Patent literature 3: Japanese Patent Laid-Open No. 2018-504703

SUMMARY OF THE INVENTION

Technical Problem

However, even if the techniques described in the above literatures are applied to identity verification when opening an account from a terminal, it takes labor to input user information necessary for eligibility examination.

The present invention provides a technique of solving the above-described problem.

Solution to Problem

One example aspect of the present invention provides an information processing apparatus comprising:
a first feature extractor that extracts a first feature from a face image of a user included in a moving image;
a second feature extractor that extracts a second feature from a face image of an identity verification document for authenticating the user included in the moving image;
a first collator that collates whether the first feature and the second feature match each other;
a first determiner that instructs the user to perform a predetermined action, and determines whether an action of the user included in the moving image corresponds to the instructed predetermined action; and
a verifier that verifies that the user is the person himself or herself, when the first feature and the second feature match each other and the action of the user included in the moving image corresponds to the instructed predetermined action.

Another example aspect of the present invention provides an information processing method comprising:
extracting a first feature from a face image of a user included in a moving image;
extracting a second feature from a face image of an identity verification document for authenticating the user included in the moving image;
collating whether the first feature and the second feature match each other;
instructing the user to perform a predetermined action, and determining whether an action of the user included in the moving image corresponds to the instructed predetermined action; and
verifying that the user is the person himself or herself, when the first feature and the second feature match each other and the action of the user included in the moving image corresponds to the instructed predetermined action.

Still other example aspect of the present invention provides an information processing program for causing a computer to execute a method, comprising:
extracting a first feature from a face image of a user included in a moving image;
extracting a second feature from a face image of an identity verification document for authenticating the user included in the moving image;
collating whether the first feature and the second feature match each other;
instructing the user to perform a predetermined action, and determining whether an action of the user included in the moving image corresponds to the instructed predetermined action; and
verifying that the user is the person himself or herself, when the first feature and the second feature match each other and the action of the user included in the moving image corresponds to the instructed predetermined action.

Advantageous Effects of Invention

According to the present invention, it is possible to readily, reliably perform identity verification and input user information when opening an account from a terminal.

BRIEF DESCRIPTION OF DRAWINGS

FIG. 6B is a view showing the structure of an identity verification information holder according to the second example embodiment of the present invention;

FIG. 7B is a table showing the structure of a liveness determination table according to the second example embodiment of the present invention;

FIG. 15 is a table showing the structure of a liveness determination table according to the third example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An information processing apparatus 100 according to the first example embodiment of the present invention will be described with reference to FIG. 1. The information processing apparatus 100 is an apparatus that performs identity verification for account opening or account use.

Figure 1:
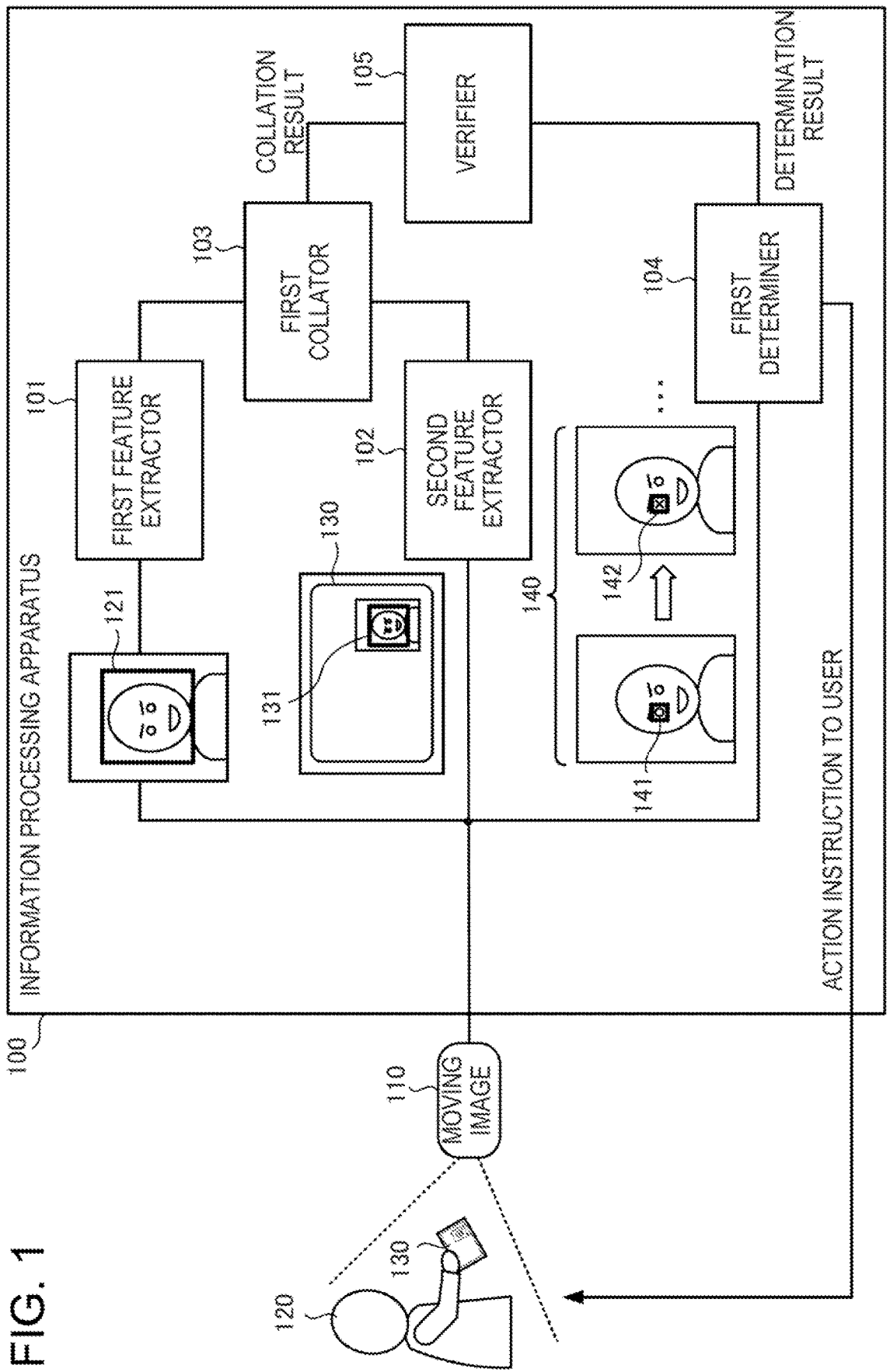
FIG. 1 is a block diagram showing the arrangement of an information processing apparatus according to the first example embodiment of the present invention.

As shown in FIG. 1, the information processing apparatus 100 includes a first feature extractor 101, a second feature extractor 102, a first collator 103, a first determiner 104, and a verifier 105. The first feature extractor 101 extracts the first feature from a face image 121 of a user 120 included in a moving image 110. The second feature extractor 102 extracts the second feature from a face image 131 of an identity verification document 130 for authenticating the user 120 included in the moving image 110. The first collator 103 collates whether the first and second features match each other. The first determiner 104 instructs the user 120 to perform a predetermined action, and determines whether an action 140 (141→142) of the user 120 included in the moving image 110 corresponds to the instructed predetermined action. When the first and second features match each other and the action 140 (141→142) of the user 120 included in the moving image 110 corresponds to the instructed predetermined action, the verifier 105 verifies that the user 120 is the person himself or herself.

According to this example embodiment, since identity verification is performed by collation between a face image of a user included in a moving image and a face image of an identity verification document and collation between an instructed action and an action of the user, it is possible to readily, reliably perform identity verification and input user information when opening an account from a terminal.

Second Example Embodiment

An information processing apparatus according to the second example embodiment of the present invention will be described next. A communication terminal as the information processing apparatus according to this example embodiment efficiently executes identity verification processing of the user and user information acquisition processing in opening an account of a bank, and transmits a result to an eligibility examination server. The eligibility examination server screens the eligibility of the user. If the user is eligible, a bank account opening server opens a new account. Note that this example embodiment may be applied to update of user information in an account. Note also that this example embodiment will exemplify, as an identity verification document used for identity verification, a license that is one of identity cards but the document is not limited to the license, and may be an arbitrary document including the face image of the user and user information.

<<Overview of Account Opening Operation>>

Figure 2A:
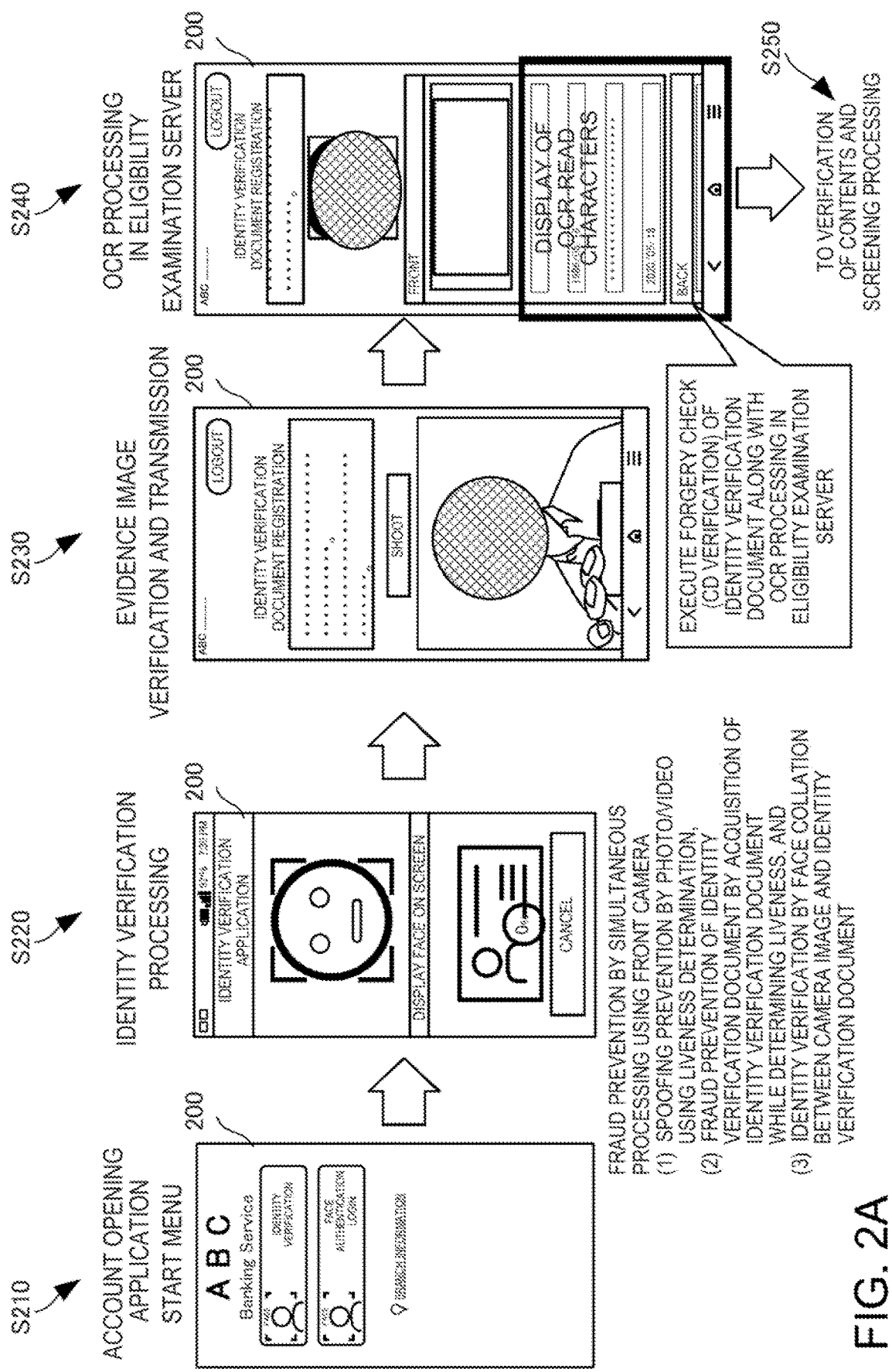
FIG. 2A is a view showing an overview of an account opening operation by an information processing apparatus according to the second example embodiment of the present invention.

FIG. 2A is a view showing an overview of an account opening operation by an information processing apparatus 200 according to this example embodiment.

In step S210, a communication terminal as the information processing apparatus 200 starts an account opening application. Then, in step S210, login processing to the account opening application and the like are performed but a description of a detailed procedure will be omitted.

In step S220, the communication terminal as the information processing apparatus 200 performs identity verification of the user who is performing an account opening operation, and determines whether user information to be transmitted to the eligibility examination server that examines the eligibility of the user as an account opener has correctly been acquired.

Identity verification of the user is performed to avoid a case in which another person spoofs the user himself or herself to perform an account opening operation, a case in which another person uses a recorded image to make it look as if the user himself or herself were operating, and the like. In this example embodiment, a fraud is prevented by simultaneous processing using a front camera, as follows: (1) Spoofing prevention by a photo/video using liveness determination; (2) Fraud prevention of identity verification document by acquisition of an identity verification document (that is, a face image of the user and an identity verification image are captured as images in the same frame) while determining liveness; and (3) Identity verification by face collation between a camera image and an identity verification document In this example embodiment, since user information is acquired from a license, it is determined whether the license is authentic or fake.

If the user who is performing the account opening operation is the person himself or herself, and it is verified that the operation is currently performed (liveness determination), the communication terminal as the information processing apparatus 200 transmits, in step S230, the user information (including a moving image and a still image) collected in step S220 to the eligibility examination server that examines the eligibility of the user as an account opener.

In step S240, the eligibility examination server functioning as an eligibility examiner converts the received user information (including the moving image and the still image) into character codes by performing OCR (Optical Character Recognition) processing of the front and back images of the license, thereby generating user information. Note that if an error occurs in character recognition in the OCR processing, the generated user information may be transmitted to the communication terminal, and verified or modified. Then, in step S250, the eligibility examination server performs screening of the eligibility of the user by collating the verified or modified user information with ineligibility information registered in advance.

If the user who has requested to open an account is determined to be eligible, the bank account management server functioning as an account opening unit that manages the bank accounts of each bank is notified of the user information and eligibility examination passing information, performs new account opening processing, and then notifies, via the communication terminal, the user that account opening is complete.

(Identity Verification Processing)

Figure 2B:
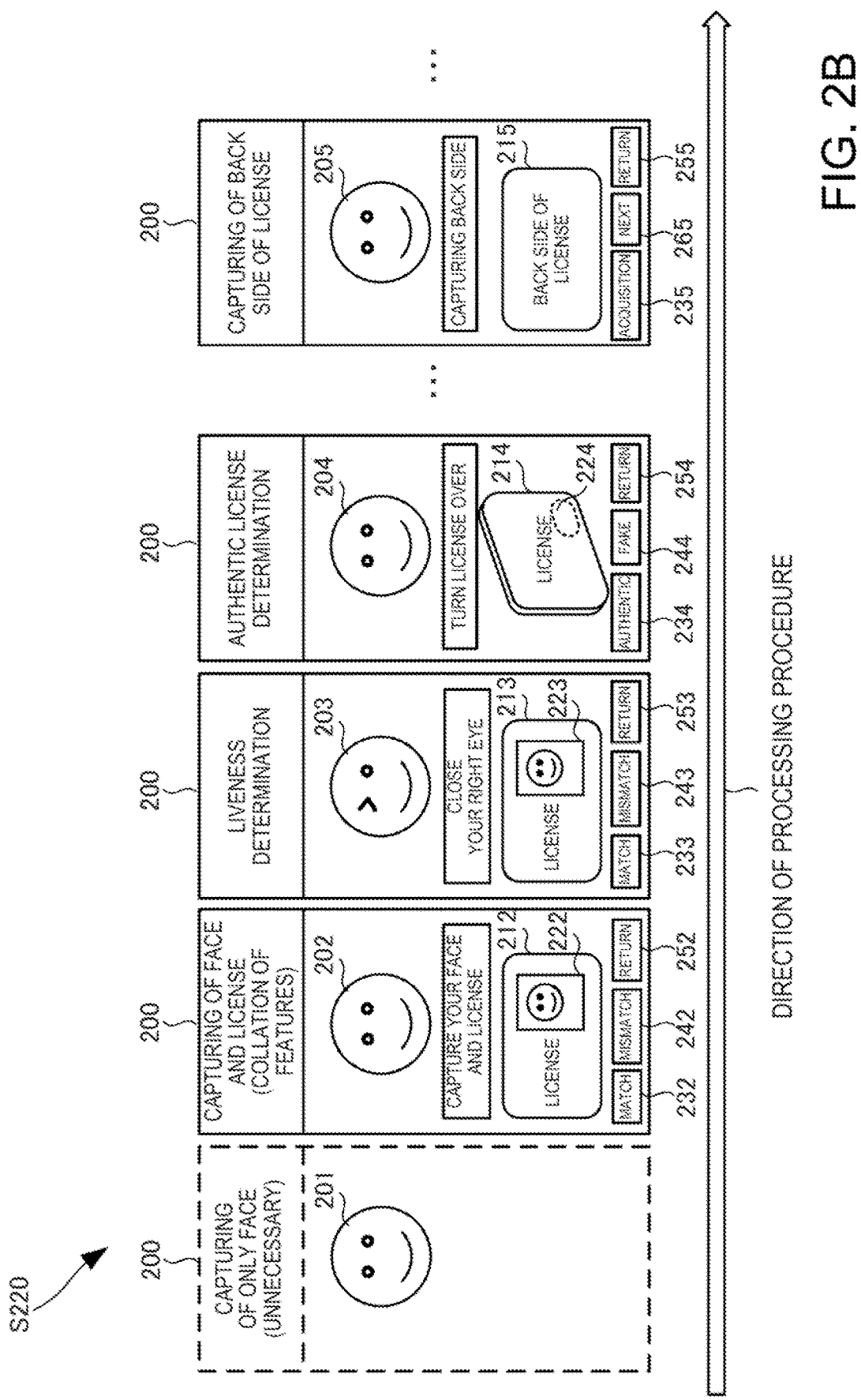
FIG. 2B is a view showing an overview of the operation of identity verification processing by the information processing apparatus according to the second example embodiment of the present invention.

FIG. 2B is a view showing an overview of the operation of the identity verification processing (S220) by the information processing apparatus 200 according to this example embodiment.

Referring to FIG. 2B, the processing of the communication terminal as the information processing apparatus 200 advances in the direction of an arrow. Note that the processing procedure shown in FIG. 2B is merely an example, and the position of liveness determination may be changed and the order of processes may be reversed.

First, after activating the account opening application and performing login processing, a moving image including a face 201 of the user himself or herself is captured by an image capturer (camera) of the communication terminal.

In response to a message "capture your face and license" from the communication terminal, the user sets his/her face and the front side of the license in the moving image. The communication terminal extracts a face image 202 of the user and a license 212 from the moving image. Next, the communication terminal extracts a face image (face photo) 222 of the user from the license 212. Then, the communication terminal extracts the feature of the face image 202 of the user and that of the face image 222 of the license and collates them with each other. If, as a result of collation, the features match each other, "match" 232 is displayed; otherwise, "mismatch" 242 is displayed. If the "mismatch" 242 is displayed, the user presses a return button 252 to collate again the face images with each other.

If the "match" 232 is displayed, the communication terminal shifts to liveness determination. In liveness determination, in response to a message "close your right eye"

from the communication terminal, the user closes his/her right eye like a face image 203. In liveness determination, if the instruction of the message matches the user action, "match" 233 is displayed; otherwise, "mismatch" 243 is displayed. Note that during liveness determination as well, a license 213 and a face image 223 may be acquired simultaneously and held. Note that this liveness determination is performed by a user action corresponding to a randomly selected instruction. However, to ensure liveness determination, it is desirable to perform determination by user actions corresponding to a plurality of randomly selected instructions. If the "mismatch" 243 is displayed, the user presses a return button 253 to perform liveness determination again. However, if "mismatch" is displayed a predetermined number of times, non-liveness may be determined, thereby ending the processing. In this case, information held until now is discarded to restart the processing from authentication of a face image.

If the "match" 233 is successively displayed a predetermined number of times, the communication terminal shifts to capturing of the back side of the license. In capturing of the back side of the license, in response to a message "turn license over" from the communication terminal, the user rotates the license. Furthermore, if authentic license determination is performed, a range that does not require a PIN (Personal Identification Number), for example, a common area of an IC (Integrated Circuit) chip 224 of the license is read, it is confirmed whether data is entered in an appropriate format, and if the data is in the appropriate format, it is determined that the license is authentic. If it is determined that the license is authentic, "authentic" 234 is displayed; otherwise, "fake" 244 is displayed. If the "fake" 244 is displayed, the user presses a return button 254 to restart the processing from authentication of a face image. Note that in this example embodiment, whether the license is authentic or fake may be determined at an arbitrary timing before transmission of the user information.

If the license is turned over, a back image is acquired. If the back image is acquired, "acquisition" 235 is displayed. If the user presses a next button 265, the process shifts to step S230 in which the moving image, images, and features collected in step S220 of the identity verification processing are transmitted to the eligibility examination server for eligibility examination of the user. If a return button 255 is pressed, the account opening procedure is interrupted to return to the beginning of step S220 of the identity verification processing.

Note that FIG. 2B shows one liveness determination operation after collation of the features of the face images. However, it is desirable to repeat liveness determination every time the features of the face images are collated with each other, and simultaneously execute liveness determination during authentic license determination or capturing of the back side of the license to verify that liveness is continuous. Furthermore, in FIG. 2B, the processing is performed in an order of collation of the features of the face images liveness determination authentic license determination capturing of the back side of the license. However, liveness determination or authentic license determination may be performed first. An appropriate procedure is selected so as to more quickly, readily, and reliably perform identity verification of the user.

<<Account Opening System>>

Figure 3:
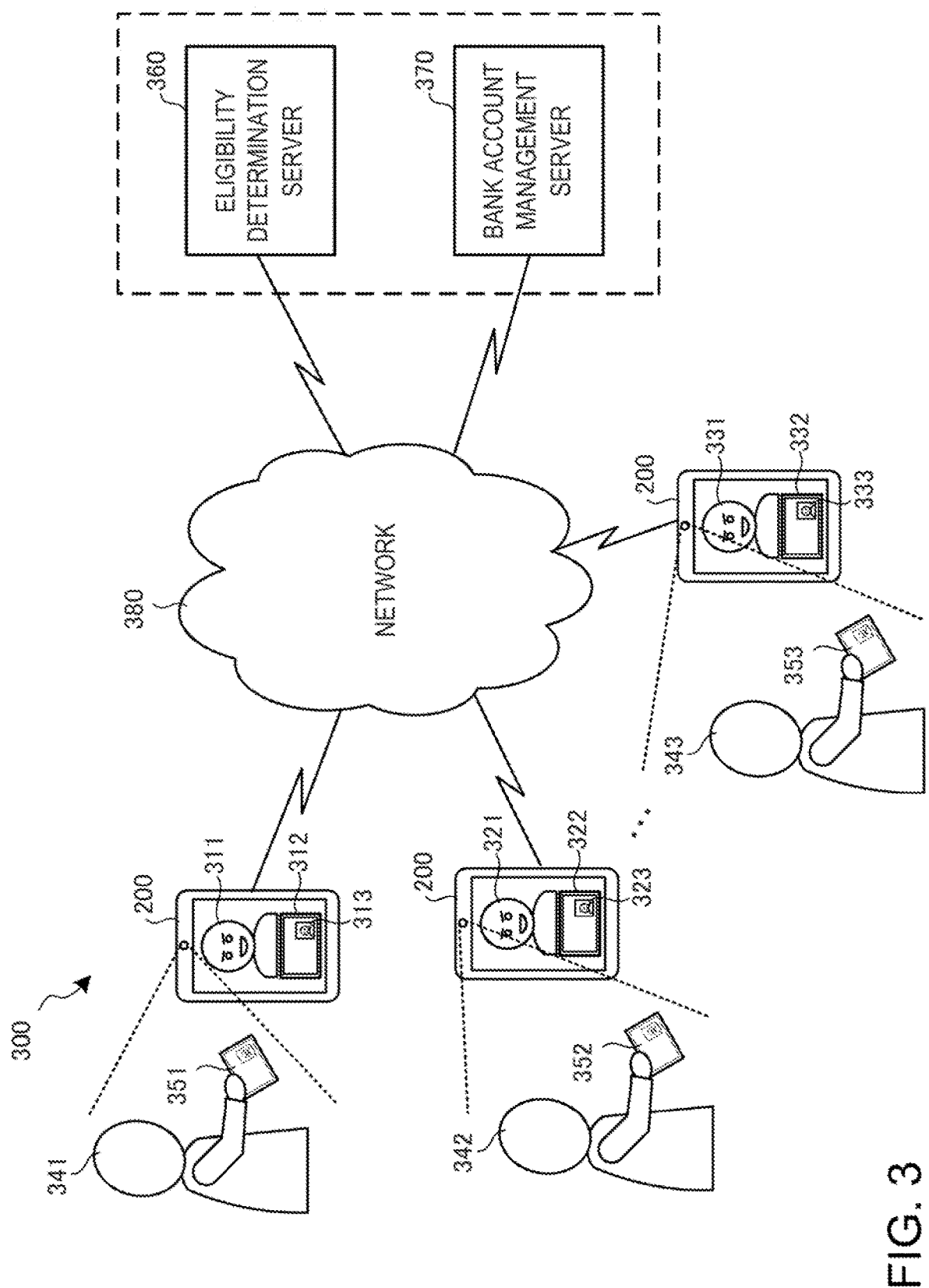
FIG. 3 is a block diagram showing the configuration of an account opening system including the information processing apparatuses according to the second example embodiment of the present invention.

FIG. 3 is a block diagram showing the configuration of an account opening system 300 including the information processing apparatuses 200 according to this example embodiment.

The account opening system 300 includes the information processing apparatus 200 of this example embodiment, an eligibility examination server 360, and a bank account management server 370, all of which are connected by a network 380. Note that the eligibility examination server 360 and the bank account management server 370 may be integrated.

If a license 351 and a user 341 are captured by a moving image, a face image 311 of the user and a face image 313 included in a license image 312 are collated with each other and match each other, and liveness is determined, one communication terminal as the information processing apparatus 200 transmits user information for account opening to the eligibility examination server 360 and the bank account management server 370. If a license 352 and a user 342 are captured by a moving image, a face image 321 of the user and a face image 323 included in a license image 322 are collated with each other and match each other, and liveness is determined, another communication terminal transmits user information for account opening to the eligibility examination server 360 and the bank account management server 370. Furthermore, if a license 353 and a user 343 are captured by a moving image, a face image 331 of the user and a face image 333 included in a license image 332 are collated with each other and match each other, and liveness is determined, still other communication terminal transmits user information for account opening to the eligibility examination server 360 and the bank account management server 370.

The eligibility examination server 360 receives user information included in the license image having undergone identity verification of the user by the information processing apparatus 200, converts the user information into character codes by OCR processing, and examines the eligibility of the user for account opening by collation with the ineligibility information. The bank account management server 370 opens a new account of the user who has been determined, by the eligibility examination server 360, to be eligible for account opening, and notifies each information processing apparatus 200 of it.

(Operation Sequence)

Figure 4A:
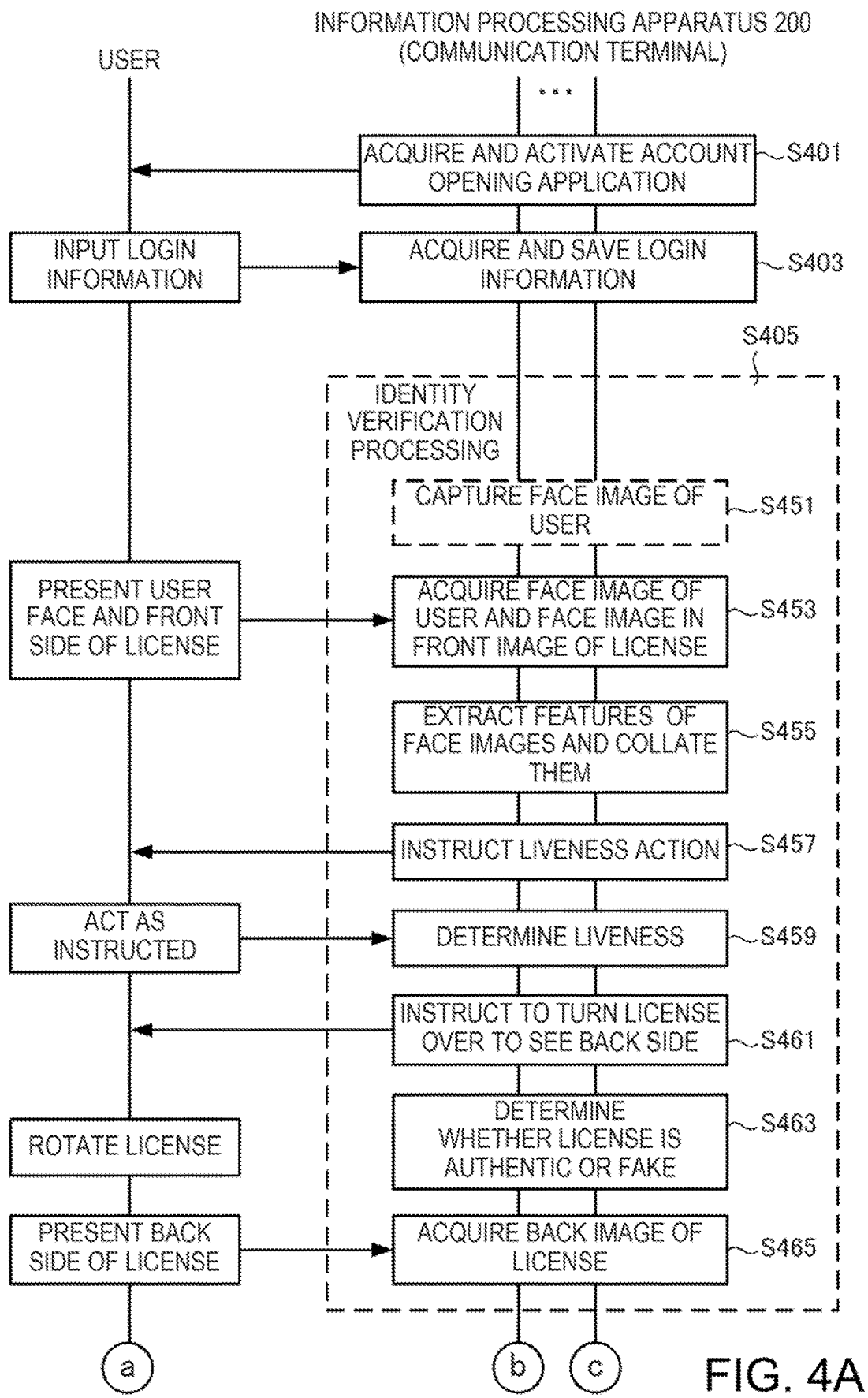
FIG. 4A is a sequence chart showing the operation procedure of the account opening system including the information processing apparatus according to the second example embodiment of the present invention.
Figure 4B:
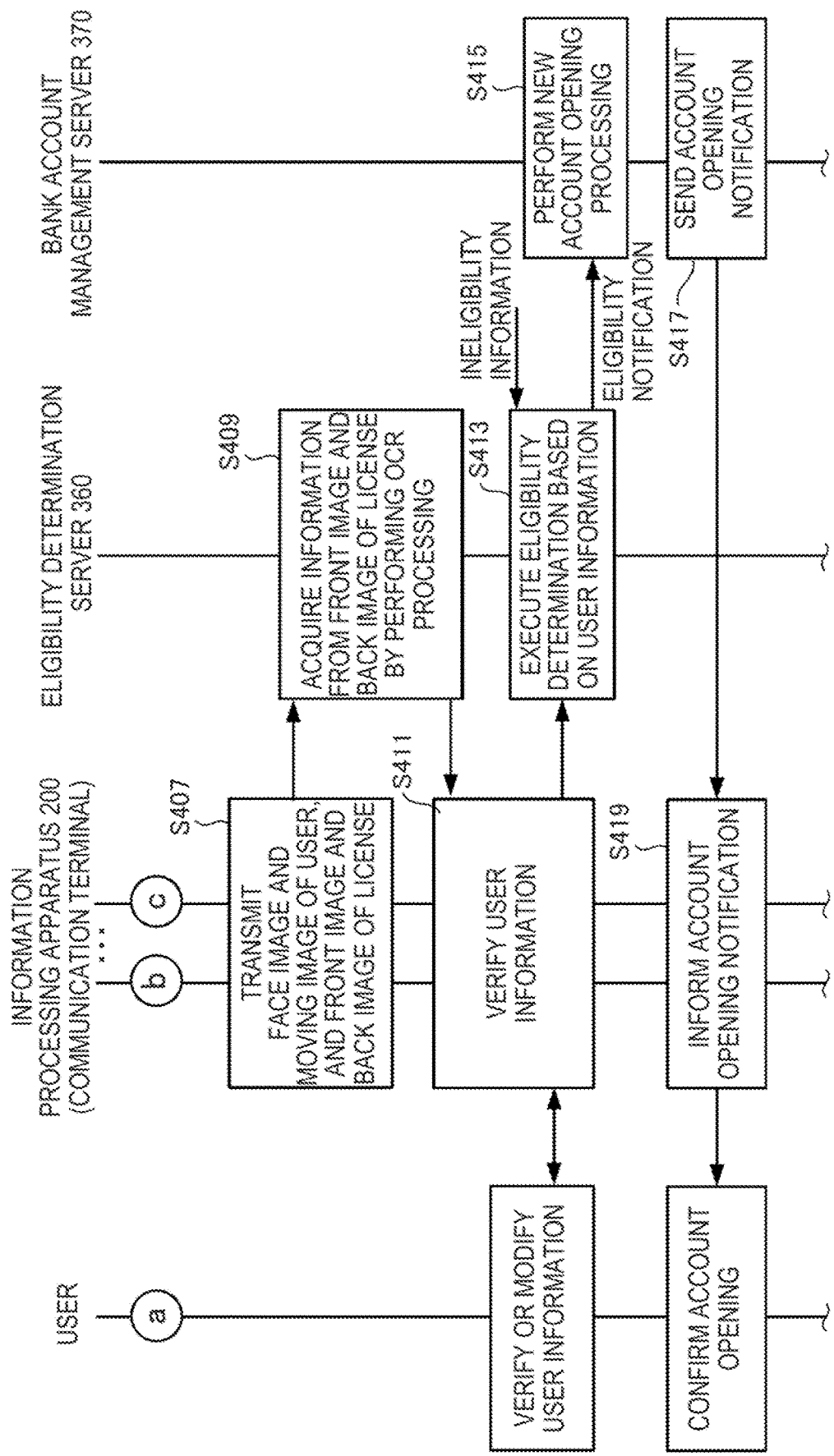
FIG. 4B is a sequence chart showing the operation procedure of the account opening system including the information processing apparatus according to the second example embodiment of the present invention.

FIGS. 4A and 4B are sequence charts showing the operation procedure of the account opening system 300 including the information processing apparatus 200 according to this example embodiment. FIG. 4A shows identity verification processing of the user and user information acquisition processing in the communication terminal as the information processing apparatus 200, and FIG. 4B shows bank account opening processing after identity verification.

Referring to FIG. 4A, in step S401, the communication terminal as the information processing apparatus 200 acquires the account opening application and activates it. In step S403, the communication terminal as the information processing apparatus 200 acquires login information and other information input by the user and saves them.

In step S405, the communication terminal as the information processing apparatus 200 executes identity verification processing of the user only in the communication terminal as the information processing apparatus 200 before transmitting the user information for eligibility examination or account opening.

If the identity verification processing of the user succeeds in step S405, in FIG. 4B, the communication terminal as the information processing apparatus 200 transmits, in step S407, to the eligibility examination server 360, the face image and moving image of the user and the front image and back image of the license which have been acquired and held by the communication terminal as the information processing apparatus 200 during the identity verification processing in step S405. In step S409, the eligibility examination server 360 converts the front image and back image of the license into character codes by OCR processing to acquire user information. Then, the eligibility examination server 360 inquires of the communication terminal as the information processing apparatus 200 about verification of the user information or modification of the user information. In step S411, the communication terminal as the information processing apparatus 200 inquires of the user about verification of the user information or modification of the user information, and returns a result to the eligibility examination server 360. Note that the OCR processing may be performed by the communication terminal as the information processing apparatus, as will be described in the sixth example embodiment (FIG. 25), and user information obtained by converting the front image/back image of the license into character codes may be transmitted to the eligibility examination server 360 and the bank account management server 370.

In step S413, the eligibility examination server 360 executes eligibility examination based on collation between the verified or modified user information and the ineligibility information. Then, if the user is determined to be eligible, the eligibility examination server 360 notifies the bank account management server 370 of it. Upon receiving the notification that the user is eligible, the bank account management server 370 performs new account opening processing in step S415. In step S417, the bank account management server 370 notifies the communication terminal as the information processing apparatus 200 of completion of the account opening processing. In step S419, the communication terminal as the information processing apparatus 200 notifies the user of completion of account opening, and the user confirms it.

The identity verification processing of the user in step S405 will be described in detail next.

In step S451, the communication terminal as the information processing apparatus 200 acquires a face image of the user from the moving image captured by the image capturer. Note that the processing in step S451 need not be performed. In step S453, the communication terminal as the information processing apparatus 200 acquires, from the moving image obtained by capturing the user face and the front side of the license presented by the user, a face image of the user and a face image included in a front image of the license. In step S455, the communication terminal as the information processing apparatus 200 extracts features of the face image of the user and the face image of the license surface, and collates the extracted features with each other.

If, as a result of the collation between the features, it is determined that the face images match each other, the communication terminal as the information processing apparatus 200 instructs, in step S457, a user action for liveness determination. If the user acts in response to the action instruction from the communication terminal as the information processing apparatus 200, the communication terminal as the information processing apparatus 200 recognizes the user action and, if the user action corresponds to the action instruction, determines liveness in step S459.

If the face images match each other and liveness is determined, the communication terminal as the information processing apparatus 200 instructs, in step S461, the user to capture the back side of the license by turning the license over. To capture the back side of the license, the user rotates the license. On the other hand, in step S463, the communication terminal as the information processing apparatus 200 determines whether the license is authentic or not.

Finally, in step S465, the communication terminal as the information processing apparatus 200 captures a moving image of the back side of the turned license. Note that the face image of the user and the license are always included in a series of moving images.

Note that the liveness determination processing in steps S457 and S459 may be repeatedly executed during the collation processing or determination processing in another step if liveness verification is required.

<<Functional Arrangement of Communication Terminal>>

Figure 5:
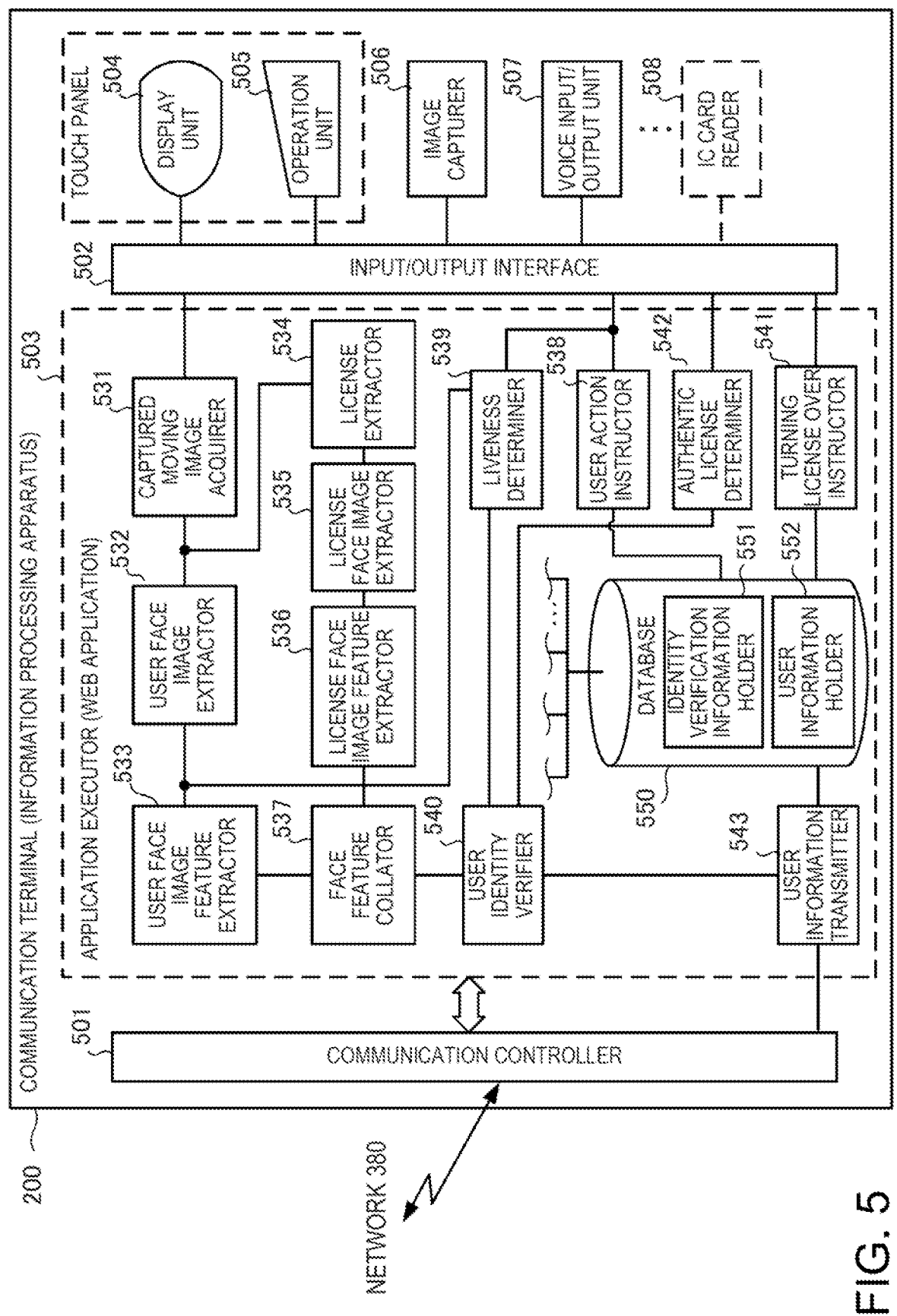
FIG. 5 is a block diagram showing the functional arrangement of a communication terminal as the information processing apparatus according to the second example embodiment of the present invention.

FIG. 5 is a block diagram showing the functional arrangement of the communication terminal as the information processing apparatus 200 according to this example embodiment.

The information processing apparatus 200 includes a communication controller 501, an input/output interface 502, and an application executor 503. The information processing apparatus 200 includes a display unit 504, an operation unit 505, an image capturer 506, a voice input/output unit 507, and an optional IC card reader 508, all of which are connected to the input/output interface 502. The display unit 504 and the operation unit 505 may be implemented by a touch panel. Note that FIG. 5 shows the image capturer 506 as a component of the information processing apparatus 200. However, for example, an image capturer with a resolution high enough for OCR processing may be externally connected to the information processing apparatus 200. The communication controller 501 controls communication with the eligibility examination server 360 and the bank account management server 370 via the network 380. The input/output interface 502 controls input/output to/from an input/output device.

The application executor 503 includes a captured moving image acquirer 531, a user face image extractor 532, a user face image feature extractor 533, a license extractor 534, a license face image extractor 535, a license face image feature extractor 536, and a face feature collator 537. The user face image extractor 532 and the user face image feature extractor 533 correspond to the first feature extractor 102 shown in FIG. 1. The license extractor 534, the license face image extractor 535, and the license face image feature extractor 536 correspond to the second feature extractor 101 shown in FIG. 1.

The captured moving image acquirer 531 acquires a moving image captured by the image capturer 506. The user face image extractor 532 extracts a face image of the user from the moving image acquired by the captured moving image acquirer 531. The user face image feature extractor 533 extracts, by a predetermined algorithm, a face feature from the face image of the user extracted by the user face image extractor 532. The license extractor 534 extracts a license from the moving image acquired by the captured moving image acquirer 531. The license face image extractor 535 extracts a face image included on the front side of the license extracted by the license extractor 534. The license face image feature extractor 536 extracts, by the same predetermined algorithm, a face feature from the face image included on the front side of the license extracted by the license face image extractor 535. The face feature collator 537 collates the face feature of the user extracted by the user face image feature extractor 533 with that of the license extracted by the license face image feature extractor 536, and outputs a collation result indicating whether the face images match each other.

The application executor 503 further includes a user action instructor 538, a liveness determiner 539, a user identity verifier 540, a turning license over instructor 541, an authentic license determiner 542, a user information transmitter 543, and a database 550. The user action instructor 538 and the liveness determiner 539 correspond to the first determiner 104 shown in FIG. 1. The turning license over instructor 541 and the authentic license determiner 542 will be referred to as the second determiner. Furthermore, the user identity verifier 540 is called the first verifier when performing identity verification of the user based on the collation result of the face feature collator 537 and the determination result of the liveness determiner 539, and is called the second verifier when additionally considering the determination result of the authentic license determiner 542.

The user action instructor 538 instructs, by an output from the display unit 504 or the voice input/output unit 507, an action randomly selected for the user for liveness determination. The liveness determiner 539 collates an action seen in, in this example, the face image of the user from the user face image extractor 532 with the action instruction output from the user action instructor 538, and determines whether the action corresponds to the action instruction. Note that if an action instruction for a part other than the face of the user is issued, a corresponding part is extracted from the captured moving image.

Based on the collation result of the face feature collator 537 and the determination result of the liveness determiner 539 or the collation result of the face feature collator 537, the determination result of the liveness determiner 539, and the determination result of the authentic license determiner 542, the user identity verifier 540 verifies that the user is the person himself or herself.

To capture the back side of the license, the turning license over instructor 541 instructs, by an output from the display unit 504 or the voice input/output unit 507, the user to present the back side of the license in front of the image capturer. The authentic license determiner 542 reads, by the optionally connected IC card reader 508, a range that does not require a PIN (Personal Identification Number), for example, a common area of the IC chip 224 of the license, confirms whether data is entered in an appropriate format, and determines, if the data is in the appropriate format, that the license is authentic.

Upon receiving an identity verification result from the user identity verifier 540, the user information transmitter 543 transmits, to the eligibility examination server 360 and the bank account management server 370, the moving image, the face images, the face features, and the front image/back image of the license obtained during the above processing and held in the database 550 for eligibility examination or account opening.

The database 550 includes an identity verification information holder 551 and a user information holder 552. The identity verification information holder 551 saves various algorithms and parameters to be used for identity verification. The user information holder 552 holds the moving image, the face images, the face features, and the front image/back image of the license, which are obtained during the identity verification processing. FIG. 5 does not illustrate lines connecting the database 550 to the respective functional components in order to ovoid complicatedness. However, identity verification information is sent from the identity verification information holder 551 to each functional component that requires the information, and user information acquired by each functional component is held in the user information holder 552.

(User Information Holder)

Figure 6A:
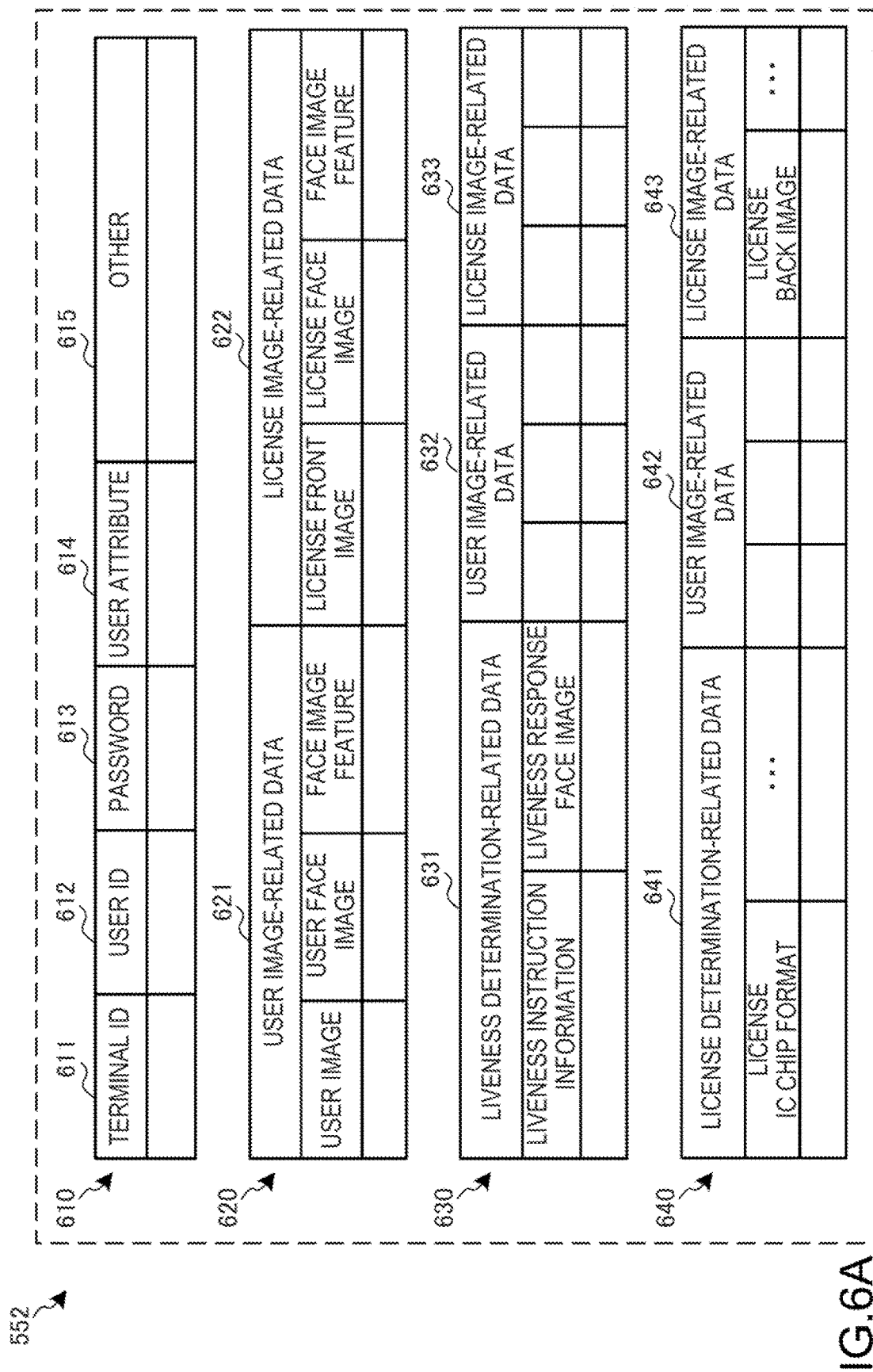
FIG. 6A is a view showing the structure of a user information holder according to the second example embodiment of the present invention.

FIG. 6A is a view showing the structure of the user information holder 552 according to this example embodiment. The user information holder 552 includes a login-related data holder 610 held in association with login, a face image-related data holder 620 held in association with collation between the face images, a liveness-related data holder 630 held in association with liveness determination, and a license-related data holder 640 held in association with license determination.

The login-related data holder 610 holds a user ID 612, a password 613, a user attribute 614, and other information 615 in association with a terminal ID 611. The login-related data holder 610 may temporarily hold the data.

The face image-related data holder 620 holds user image-related data 621 and license image-related data 622. The user image-related data 621 includes a user image, a user face image, and a face image feature. The license image-related data 622 includes a license front image, a license face image, and a face image feature. Note that the image is desirably held as a moving image.

The liveness-related data holder 630 holds liveness determination-related data 631, user image-related data 632, and license image-related data 632. The liveness determination-related data 631 includes liveness instruction information and a liveness response face image. Note that the user image-related data 632 and the license image-related data 633 include pieces of information, at the time of liveness determination, of the same types as those of pieces of information of the user image-related data 621 and the license image-related data 622.

The license-related data holder 640 holds license determination-related data 641, user image-related data 642, and license image-related data 643. The license determination-related data 641 includes a license IC chip format. Note that the user image-related data 642 includes pieces of information, at the time of license determination, of the same types as those of pieces of information of the user image-related data 621. The license image-related data 643 includes a license back image.

(Identity Verification Information Holder)

FIG. 6B is a view showing the structure of the identity verification information holder 551 according to this example embodiment. The identity verification information holder 551 includes an algorithm holder 650 that holds algorithms to be used in face image collation processing, a liveness instruction information holder 660 that holds liveness instruction information to be used in liveness determination processing, and a license determination information holder 670 to be used in license determination processing.

The algorithm holder 650 holds a license extraction algorithm 651 used by the license extractor 534 to extract a license from a captured moving image, and a face image extraction algorithm 652 used by the user face image extractor 532 or the license face image extractor 535 to extract a face image. The algorithm holder 650 holds a face image feature extraction algorithm 653 used by the user face image feature extractor 533 or the license face image feature extractor 536 to extract a feature, and a face image feature collation algorithm 654 used by the face feature collator 537 to collate the features with each other.

The liveness instruction information holder 660 holds, in association with a liveness instruction ID 661, instruction contents 662, an instruction flag 663 indicating that an instruction is in progress, and a liveness determination algorithm 664 corresponding to each liveness instruction. Examples of the instruction contents 662 include a right wink, a left wink, closing of both eyes, turning the face upward, inclining the head to the left and the right, but are not limited to them.

The license determination information holder 670 holds, in association with a license type 671, an IC chip format 672 and an algorithm 673 for determining whether the license is authentic or fake.

(Face Image Collation Table)

Figure 7A:
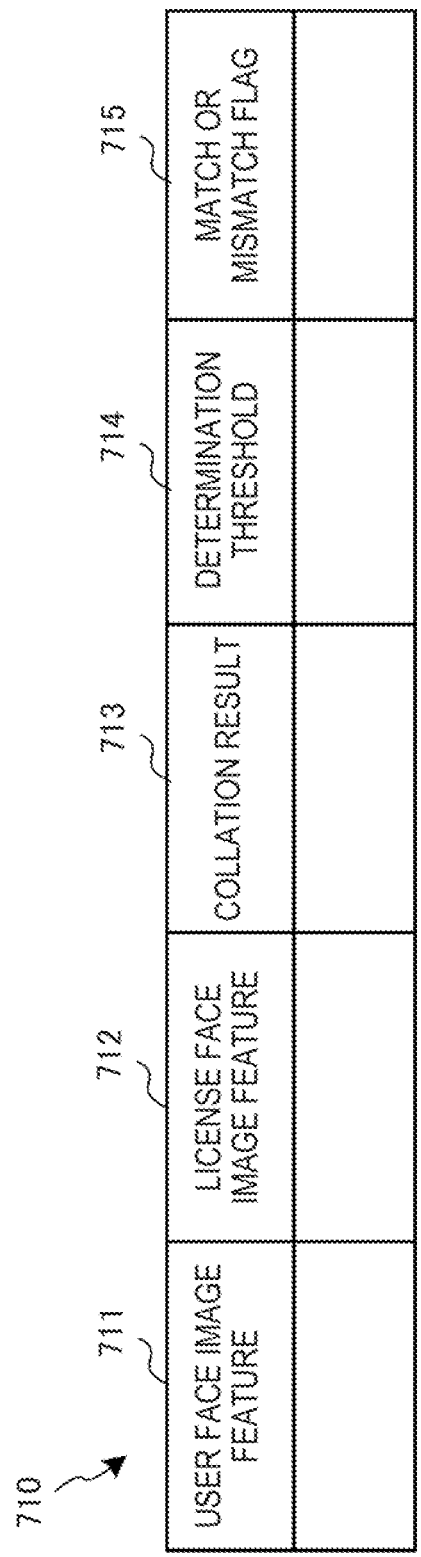
FIG. 7A is a table showing the structure of a face image collation table according to the second example embodiment of the present invention.

FIG. 7A is a table showing the structure of a face image collation table 710 according to this example embodiment. Note that the face image collation table 710 is used by the face feature collator 537 to collate the face image of the user and the face image of the license with each other.

The face image collation table 710 stores, a user face image feature 711, a corresponding license face image feature 712, a feature collation result 713, a determination threshold 714 for determining whether the features match each other, and a match or mismatch flag 715 of a determination result.

(Liveness Determination Table)

FIG. 7B is a table showing the structure of a liveness determination table 720 according to this example embodiment. Note that the liveness determination table 720 is used by the liveness determiner 539 to collate a face change instruction and a change in the face image of the user with each other.

The liveness determination table 720 stores a liveness response 722 by the user and a match or mismatch flag 723 in association with each of a plurality of liveness instructions 721. Then, the liveness determination table 720 stores a liveness determination result 724 determined based on the plurality of match/mismatch flags 723. Note that whether the liveness instruction 721 and the liveness response 722 match each other may be determined based on a threshold.

(Authentic License Determination Table)

Figure 7C:
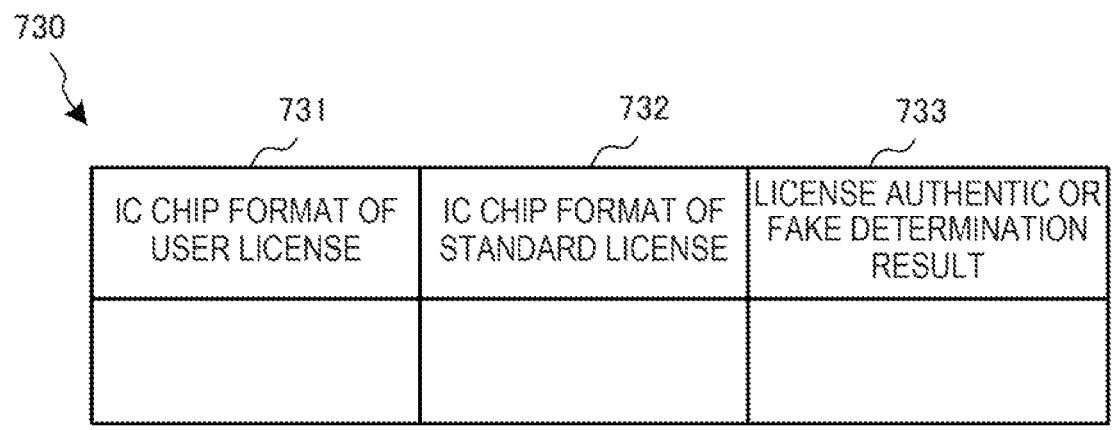
FIG. 7C is a table showing the structure of an authentic license determination table according to the second example embodiment of the present invention.

FIG. 7C is a table showing the structure of an authentic license determination table 730 according to this example embodiment. Note that the authentic license determination table 730 is used by the authentic license determiner 542 to determine, based on the IC chip format of the license, whether the user license is authentic or fake.

The authentic license determination table 730 stores an IC chip format 731 of the user license obtained from the license, an IC chip format 732 of a preset standard license, and a license authentic or fake determination result 733.

<<Hardware Arrangement of Communication Terminal>>

Figure 8:
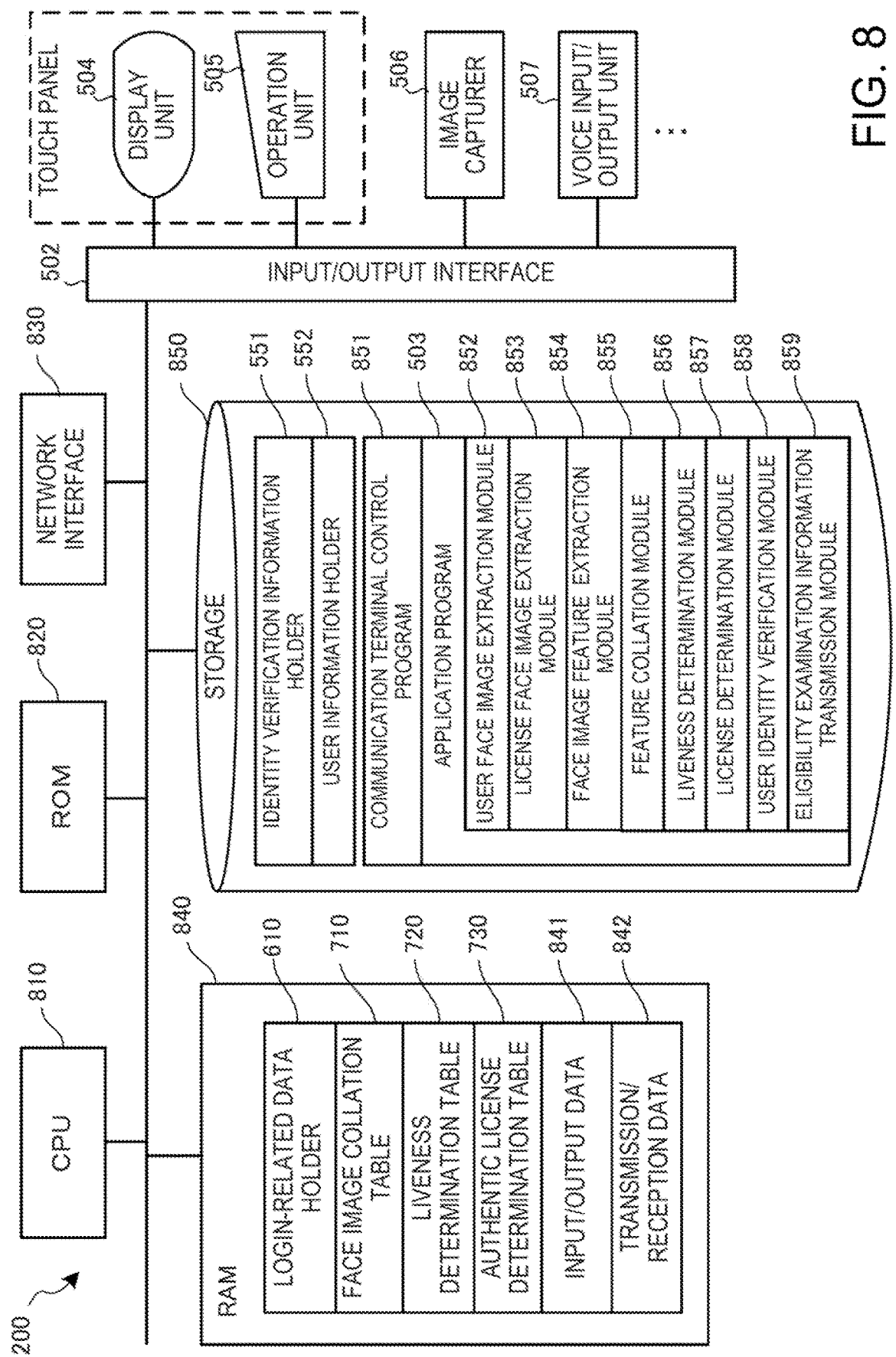
FIG. 8 is a block diagram showing the hardware arrangement of the communication terminal as the information processing apparatus according to the second example embodiment of the present invention.

FIG. 8 is a block diagram showing the hardware arrangement of the communication terminal as the information processing apparatus 200 according to this example embodiment.

In FIG. 8, a CPU (Central Processing Unit) 810 is an arithmetic control processor, and implements the functional components shown in FIG. 5 by executing a program. One CPU 810 or a plurality of CPUs 810 may be included. A ROM (Read Only Memory) 820 stores permanent data such as initial data and a program, and programs. A network interface 830 controls communication with each of the eligibility examination server 360 and the bank account management server 370 via a network.

A RAM (Random Access Memory) 840 is a random access memory used as a temporary storage work area by the CPU 810. An area to store data necessary for implementation of this example embodiment is allocated to the RAM 840. The login-related data holder 610 includes the information shown in FIG. 6A. The face image collation table 710 includes the information shown in FIG. 7A, and used to collate the face features with each other. The liveness determination table 720 includes the information shown in FIG. 7B, and is used for liveness determination. The authentic license determination table 730 includes the information shown in FIG. 7C, and is used to determine whether the license is authentic. Input/output data 841 is data input/output to/from an input/output device connected to the input/output interface 502. Transmission/reception data 842 is data transmitted/received to/from an external apparatus via the network interface 830.

A storage 850 stores a database, various parameters, or the following data or programs necessary for implementation of this example embodiment, to be used by the CPU 810. The identity verification information holder 551 holds the information to be used for identity verification processing of the user, as shown in FIG. 6B. The user information holder 552 holds the information which has been collected during the identity verification processing of the user to be used for eligibility examination, as shown in FIG. 6A.

The storage 850 stores the following programs. A communication terminal control program 851 is a program that controls the overall communication terminal as the information processing apparatus 200. An application program executed by the application executor 503 is a program for executing the identity verification processing of the user according to this example embodiment. The application program includes the following modules. A user face image extraction module 852 is a module that extracts a face image of the user from a captured moving image. A license face image extraction module 853 is a module that extracts a license from the captured moving image, and extracts a face image from a front image of the license. A face image feature extraction module 854 is a module that extracts a feature indicating a feature of the face image. A feature collation module 855 is a module that determines whether the face image of the user and the face image of the license match each other by collating the face features with each other. A liveness determination module 856 is a module that issues a random action instruction to the user, and determines, based on whether a user action corresponds to the action instruction, whether the moving image is a real-time moving image. A license determination module 857 is a module that reads the IC chip format of the user license, and determines, based on the IC chip format, whether the license is authentic or fake. A user identity verification module 858 is a module that verifies whether the user is the person himself or herself by combining the determination results of the feature collation module 855, the liveness determination module 856, and the license determination module 857. An eligibility examination information transmission module 859 is a module that transmits, if the user identity verification module 858 verifies that the user is the person himself or herself, user information to be used for eligibility examination of the user to the eligibility examination server 360.

Note that programs and data which are associated with the general-purpose functions of the communication terminal as the information processing apparatus 200 and other feasible functions are not shown in the RAM 840 or the storage 850 of FIG. 8.

<<Processing Procedure of Communication Terminal>>

Figure 9A:
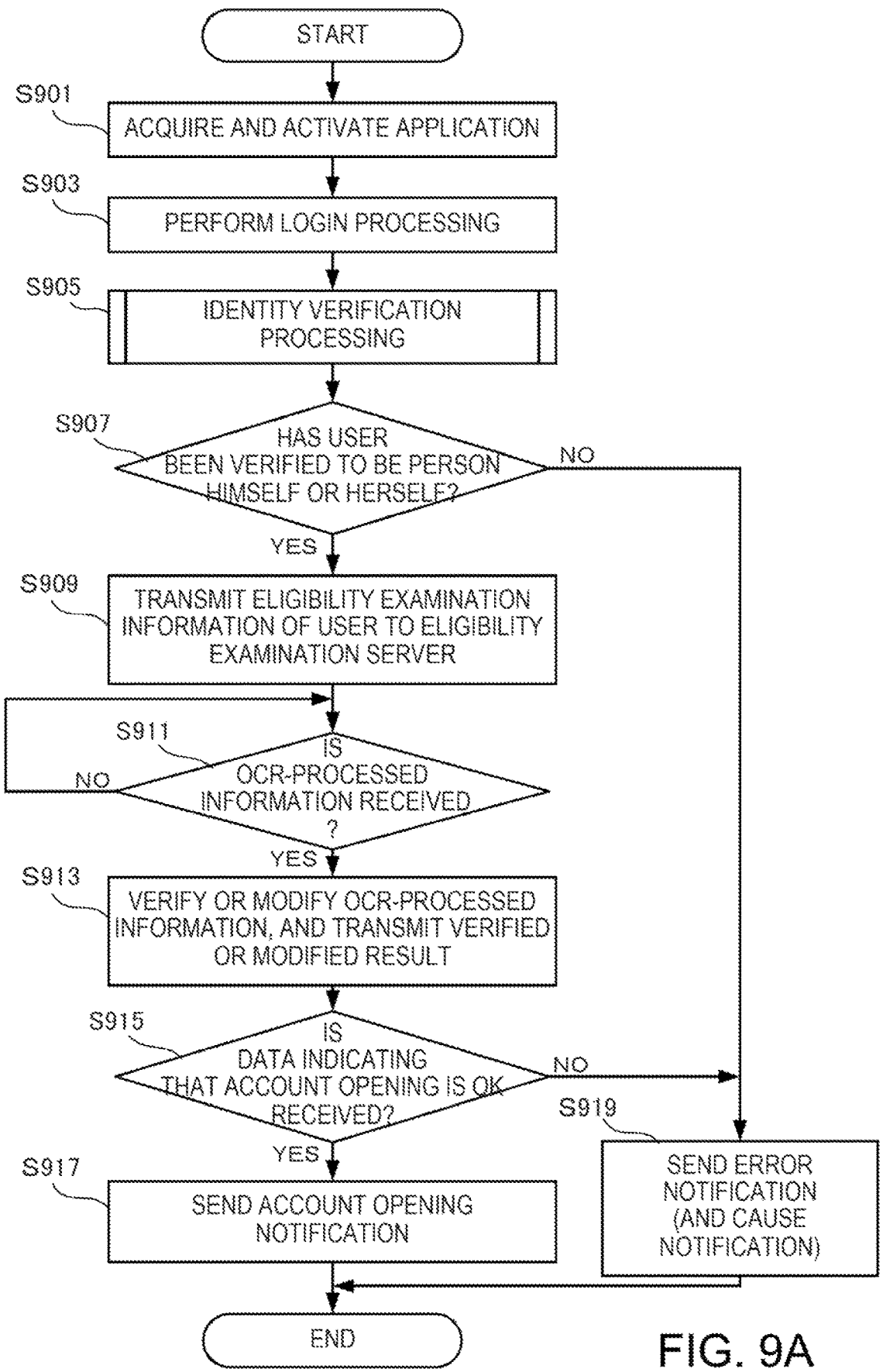
FIG. 9A is a flowchart illustrating the processing procedure of the communication terminal as the information processing apparatus according to the second example embodiment of the present invention.

FIG. 9A is a flowchart illustrating the processing procedure of the communication terminal as the information processing apparatus 200 according to this example embodiment. This flowchart is executed by the CPU 810 shown in FIG. 8 using the RAM 840, thereby implementing the functional components of the information processing apparatus 200 shown in FIG. 5.

In step S901, the information processing apparatus 200 acquires the account opening application and activates it. In step S903, the information processing apparatus 200 performs login processing. Note that the login processing may be performed by actually connecting to a Web browser or may be configured to log in to the application in the information processing apparatus 200 in a pseudo manner in order to complete subsequent identity verification of the user and user information collection in the information processing apparatus 200.

In step S905, the information processing apparatus 200 executes the identity verification processing according to this example embodiment. In step S907, the information processing apparatus 200 determines whether the user has been verified to be the person himself or herself.

If it is determined that the user has been verified to be the person himself or herself, the information processing apparatus 200 transmits, in step S909, eligibility examination information including the moving image, images, features, front and back images of the license acquired during the identity verification processing to the eligibility examination server 360. In step S911, the information processing apparatus 200 waits for reception of a result of OCR processing by the eligibility examination server 360. Upon receiving the result of the OCR processing of the front and back images of the license and the like, the information processing apparatus 200 verifies or modifies contents of the OCR result, and transmits the verified or modified contents to the eligibility examination server 360.

In step S915, the information processing apparatus 200 waits for reception of data indicating whether an account has been opened by the eligibility examination by the eligibility examination server 360 and the account opening processing by the bank account management server 370. Upon receiving an account opening completion notification, the information processing apparatus 200 notifies the user of it in step S917. On the other hand, if the identity verification fails or the user does not pass eligibility examination, the information processing apparatus 200 sends an error notification including a cause notification in step S919.

(Identity Verification Processing)

Figure 9B:
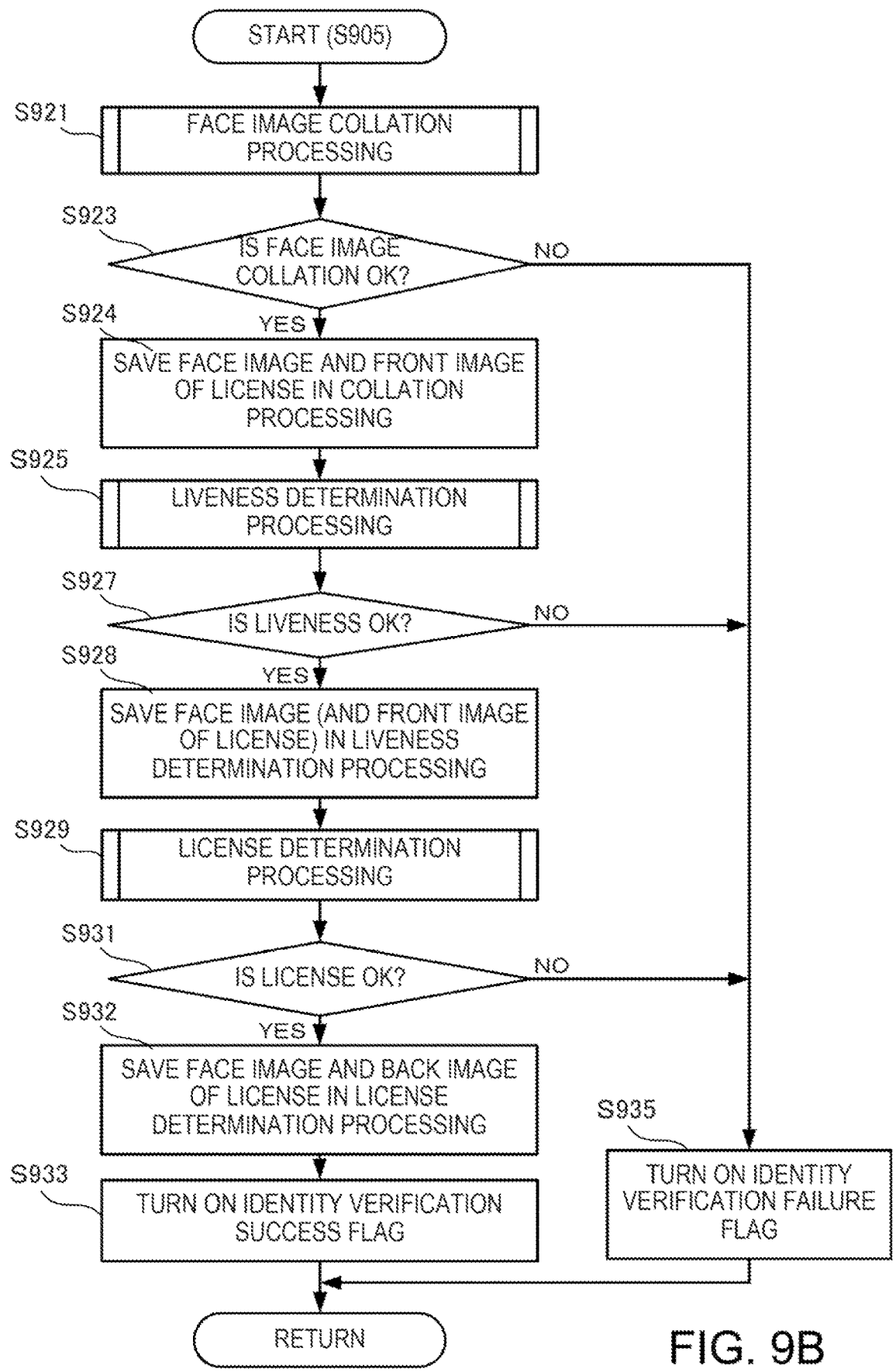
FIG. 9B is a flowchart illustrating the procedure of the identity verification processing according to the second example embodiment of the present invention.

FIG. 9B is a flowchart illustrating the procedure of the identity verification processing (S905) according to this example embodiment.

In step S921, the information processing apparatus 200 executes the face image collation processing. In step S923, the information processing apparatus 200 determines whether the collation result of the face image collation processing indicates a match. If the collation result indicates a match, the information processing apparatus 200 saves the face image and the front image of the license in the collation processing, in step S924. On the other hand, if the collation result indicates a mismatch, the information processing apparatus 200 advances to step S935, and turns on an identity verification failure flag, thereby ends the identity verification processing.

In step S925, the information processing apparatus 200 executes the liveness determination processing. In step S927, the information processing apparatus 200 determines whether the determination result of the liveness determination processing indicates liveness. If the determination result indicates liveness, the information processing apparatus 200 saves, in step S928, a face image during liveness and/or the front image of the license being captured simultaneously in the liveness determination processing. On the other hand, if the determination result does not indicate liveness, the information processing apparatus 200 advances to step S935, and turns on the identity verification failure flag, thereby ending the identity verification processing.

In step S929, the information processing apparatus 200 executes the license determination processing. In step S931, the information processing apparatus 200 determines whether the determination result of the license determination processing indicates that the license is authentic or fake. If it is determined that the license is authentic, the information processing apparatus 200 saves, in step S932, the face image during license determination and the back image of the license in the license determination processing. Then, in step S933, the information processing apparatus 200 turns on an identity verification success flag. On the other hand, if it is determined that the license is fake, the information processing apparatus 200 advances to step S935, and turns on the identity verification failure flag, thereby ending the identity verification processing.

Note that the order or combination of the determination processes when turning on the identity verification success flag is not limited to that shown in FIG. 9B. For example, the liveness determination processing may be executed before the face image collation processing. The liveness determination processing may be performed for each face image collation operation or at the time of executing the license determination processing or capturing the back side of the license in order to ensure liveness verification.

(Face Image Collation Processing)

Figure 9C:
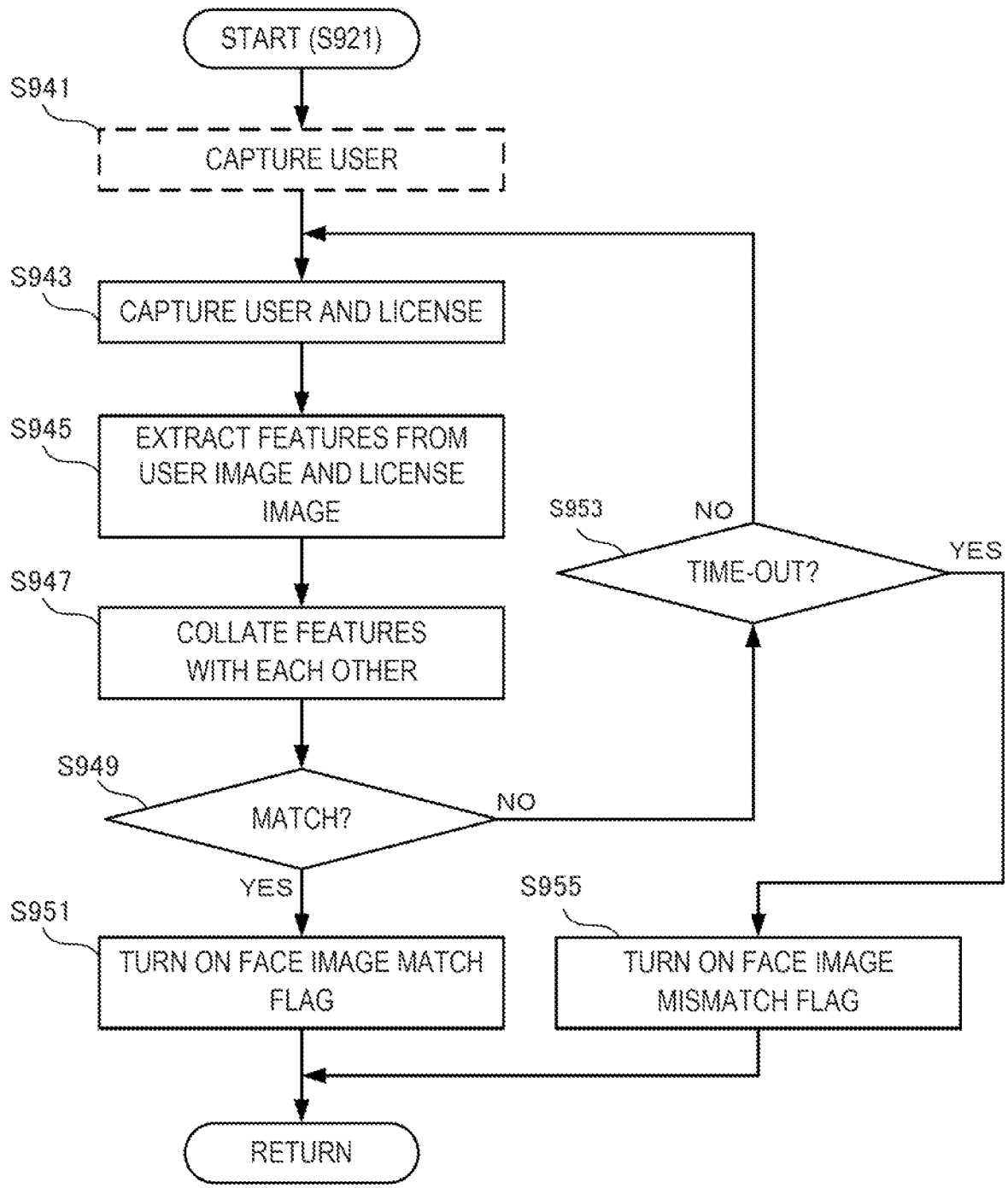
FIG. 9C is a flowchart illustrating the procedure of face image collation processing according to the second example embodiment of the present invention.

FIG. 9C is a flowchart illustrating the procedure of the face image collation processing (S921) included in the identity verification processing (S905) according to this example embodiment.

In step S941, the information processing apparatus 200 captures a moving image of the user by the image capturer. This image capturing operation is optional and need not be performed. In step S943, the information processing apparatus 200 captures a moving image including the user and the license. In step S945, the information processing apparatus 200 extracts face features from the user image and the front image of the license. More specifically, a face image of the user and a license image are extracted from the moving image and a face image is extracted from the license image. Then, a feature is extracted from each of the face image of the user and the face image of the license.

In step S947, the information processing apparatus 200 collates the extracted features with each other. That is, it is determined whether the face image of the user in the moving image and the face image of the photo of the license match each other within a predetermined error range. In step S949, the information processing apparatus 200 determines, based on a collation result, whether the face images match each other. If the face images match each other, the information processing apparatus 200 turns on a face image match flag in step S951, thereby ending the face image collation processing.

On the other hand, if the face images do not match each other, the information processing apparatus 200 determines in step S953 whether a time-out has occurred or the upper limit of the number of times of collation has been reached. If no time-out has occurred and the upper limit of the number of times of collation has not been reached, the feature collation processing is repeated from step S943; otherwise, the information processing apparatus 200 turns on a face image mismatch flag in step S955, thereby ending the face image collation processing.

(Liveness Determination Processing)

Figure 9D:
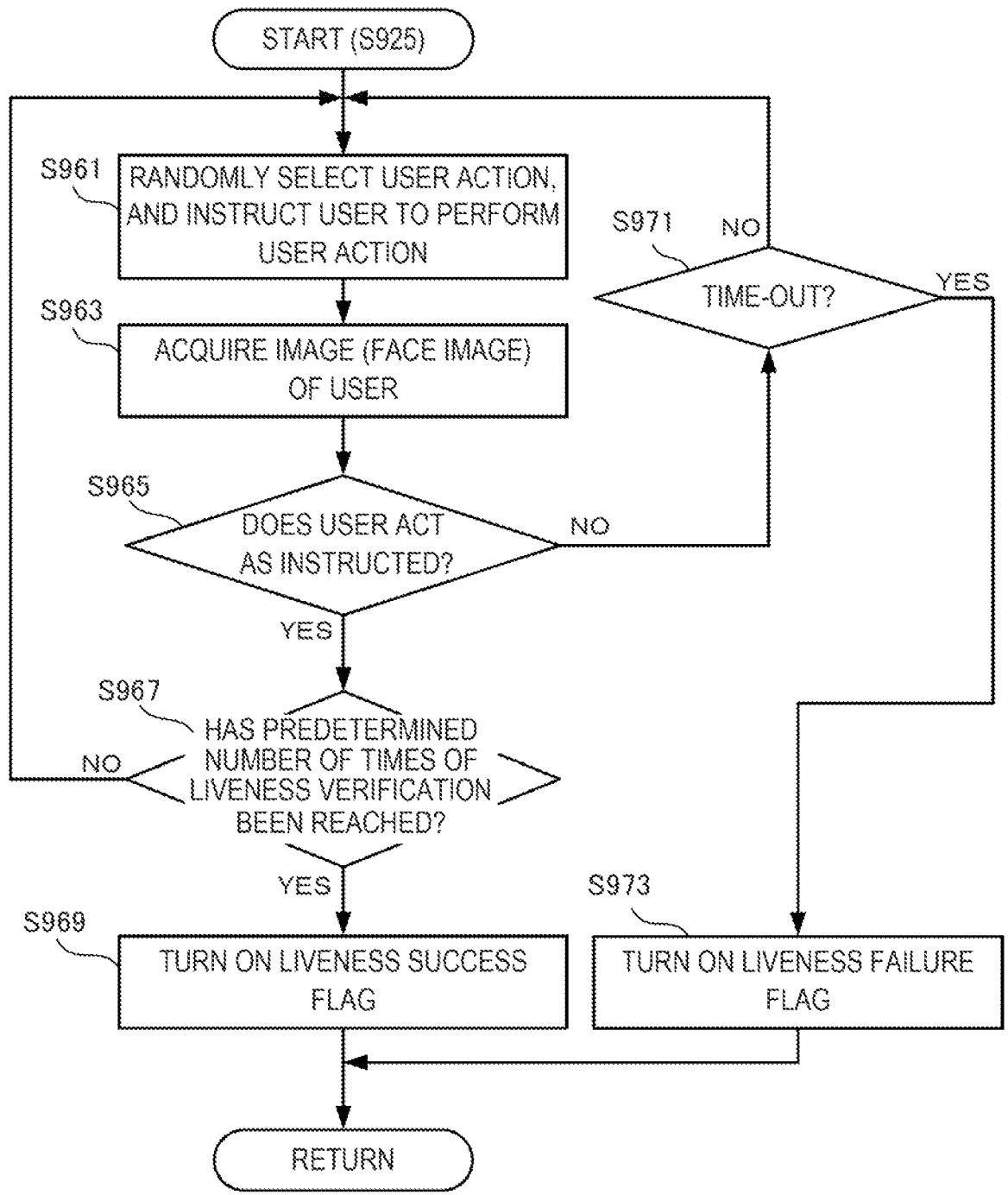
FIG. 9D is a flowchart illustrating the procedure of liveness determination processing according to the second example embodiment of the present invention.

FIG. 9D is a flowchart illustrating the procedure of the liveness determination processing (S925) included in the identity verification processing (S905) according to this example embodiment.

In step S961, the information processing apparatus 200 randomly selects an action to be instructed to the user, and instructs the user to perform the action. In step S963, the information processing apparatus 200 acquires the image or face image of the user from the moving image captured by the image capturer. Then, in step S965, the information processing apparatus 200 determines whether an action performed by the user corresponds to the action instructed to the user. For example, an action of a part of the body of the user, a change of a part of a face, or the like may be included.

If the user acts as instructed, the information processing apparatus 200 determines, in step S967, whether the number of times of liveness verification has reached a predetermined number. If the number of times of liveness verification has not reached the predetermined number, the information processing apparatus 200 returns to step S961 to continue next liveness determination; otherwise, the information processing apparatus 200 turns on a liveness success flag in step S969, thereby ending the liveness determination processing.

On the other hand, if it is determined in step S965 that the user does not act as instructed, the information processing apparatus 200 determines, in step S971, whether a time-out has occurred or the upper limit of the number of times of liveness determination has been reached. If no time-out has occurred and the upper limit of the number of times has not been reached, the liveness determination processing is repeated from step S961; otherwise, the information processing apparatus 200 turns on a liveness failure flag in step S973, thereby ending the liveness determination processing.

(License Determination Processing)

Figure 9E:
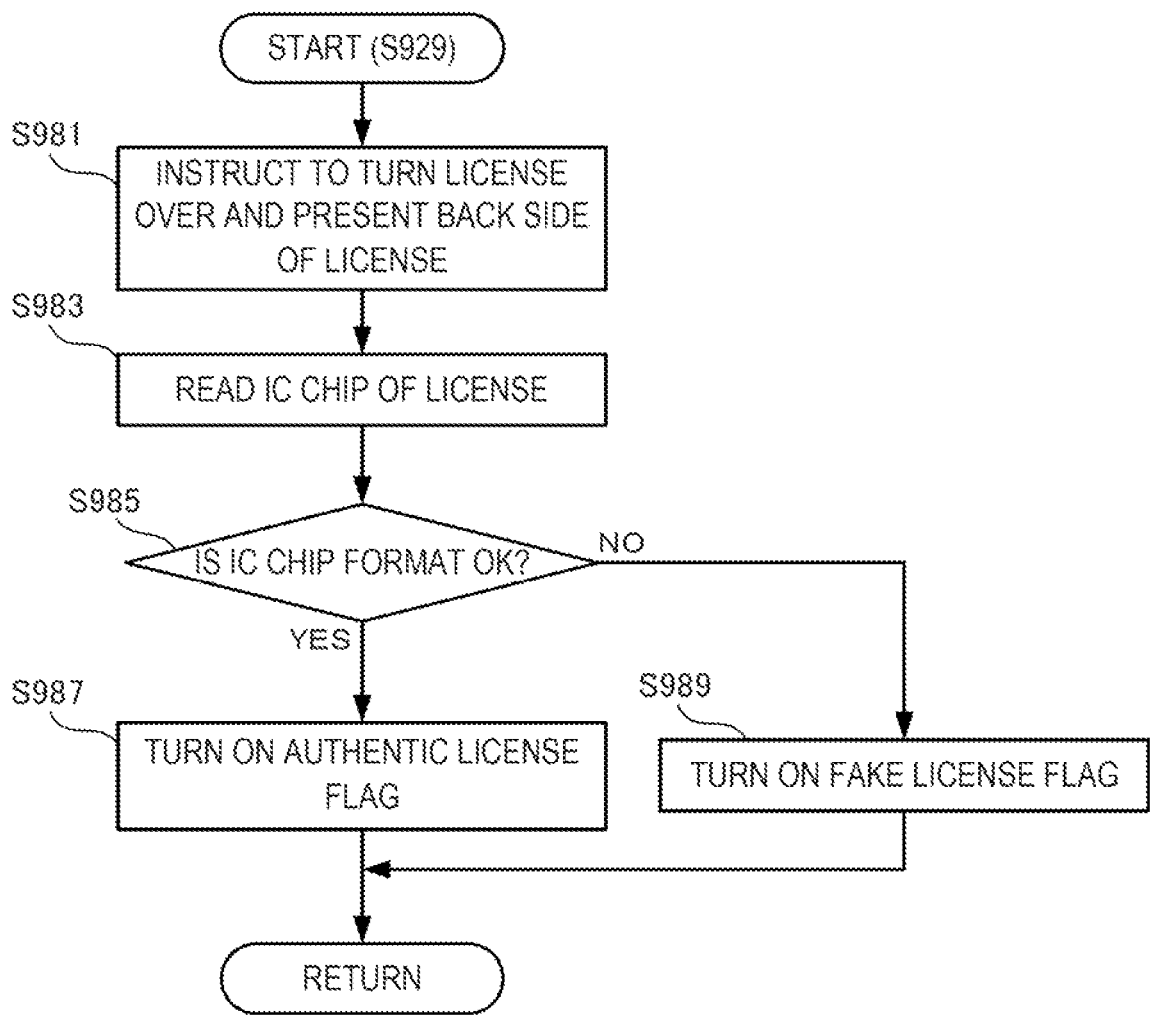
FIG. 9E is a flowchart illustrating the procedure of license determination processing according to the second example embodiment of the present invention.

FIG. 9E is a flowchart illustrating the procedure of the license determination processing (S929) included in the identity verification processing (S905) according to this example embodiment.

In step S981, the information processing apparatus 200 instructs the user to turn the license over and present the back side of the license. On the other hand, in step S983, the information processing apparatus 200 reads the IC chip of the user license, and determines whether the IC chip format of the user license matches the IC chip format of the standard license.

If it is determined in step S985 that the IC chip format of the user license matches the IC chip format of the standard license and thus the user license is authentic, the information processing apparatus 200 turns on an authentic license flag in step S987, thereby ending the license determination processing. On the other hand, if it is determined that the IC chip format of the user license does not match the IC chip format of the standard license and thus the user license is fake, the information processing apparatus 200 turns on a fake license flag in step S989, thereby ending the license determination processing.

Note that each of the above-described face image collation processing, liveness determination processing, and license determination processing is an independent routine. Therefore, the identity verification processing of an appropriate procedure or combination of the above processes can be implemented by inserting each process in a desirable position of a macro flow without limitation on the order or the number of times.

<<Processing Procedure of Eligibility Examination Server>>

Figure 10:
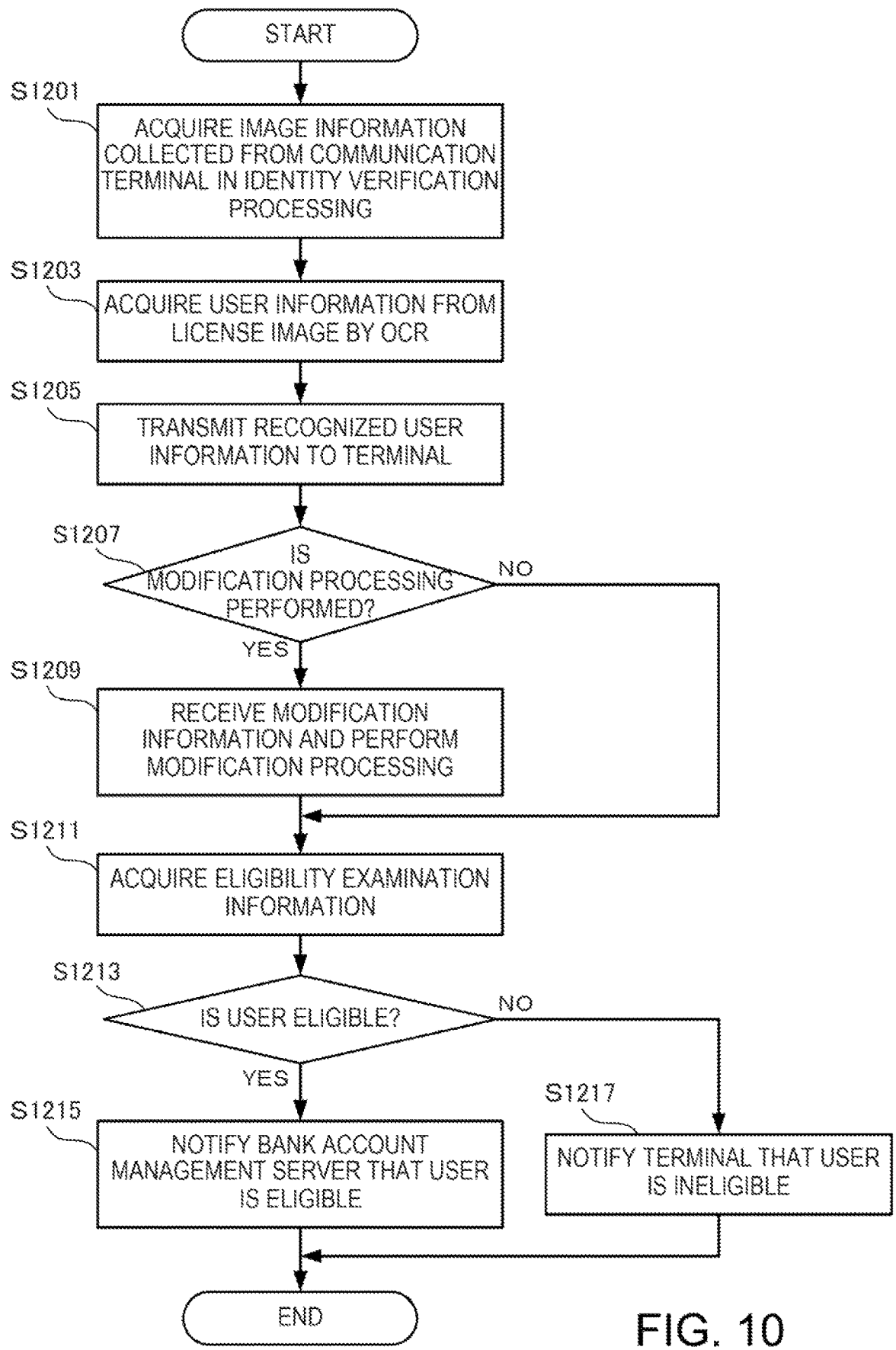
FIG. 10 is a flowchart illustrating the processing procedure of an eligibility examination server according to the second example embodiment of the present invention.

FIG. 10 is a flowchart illustrating the processing procedure of the eligibility examination server 360 according to this example embodiment.

In step S1201, the eligibility examination server 360 acquires image information collected from the communication terminal as the information processing apparatus 200 in the identity verification processing. In step S1203, the eligibility examination server 360 extracts the front and back images of the license from the acquired image information, and performs OCR processing, thereby acquiring user information. Then, the eligibility examination server 360 transmits the user information of the recognition result obtained in the OCR processing to the communication terminal to perform verification or modification. If a user modification instruction is received from the communication terminal, the eligibility examination server 360 advances from step S1207 to step S1209 to receive modification information and reflect it on the user information.

In step S1211, the eligibility examination server 360 acquires information for eligibility examination. Then, the eligibility examination server 360 collates the generated user information and the information for eligibility examination with each other, and determines in step S1213 whether the user is eligible. If it is determined that the user is eligible, the eligibility examination server 360 notifies, in step S1215, the bank account management server 370 that the user is eligible for account opening; otherwise, the eligibility examination server 360 notifies, in step S1217, from the communication terminal, the user that the user is ineligible for account opening.

<<Processing Procedure of Bank Account Management Server>>

Figure 11:
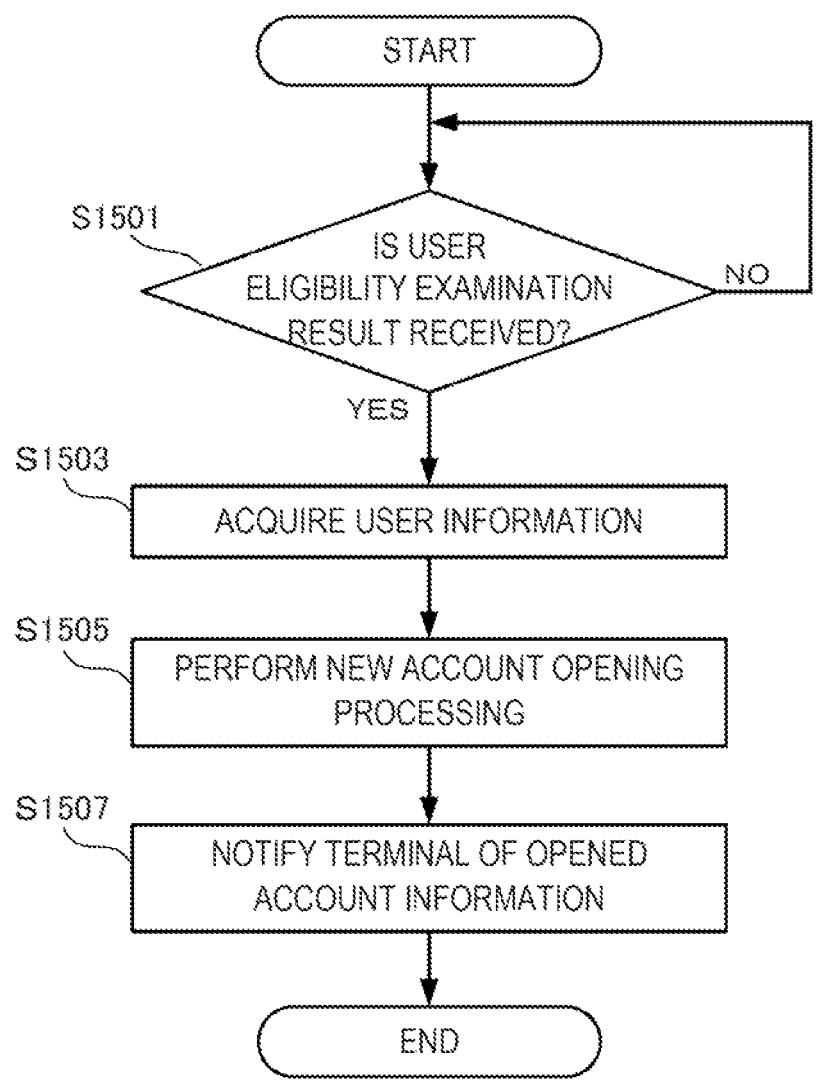
FIG. 11 is a flowchart illustrating the processing procedure of a bank account management server according to the second example embodiment of the present invention.

FIG. 11 is a flowchart illustrating the processing procedure of the bank account management server 370 according to this example embodiment.

In step S1501, the bank account management server 370 waits for reception of an eligibility examination result from the eligibility examination server 360. If success in eligibility examination is received, the bank account management server 370 acquires, in step S1503, the user information collected in the communication terminal during user verification processing. In step S1505, the bank account management server 370 opens a new account based on the acquired user information. In step S1507, the bank account management server 370 notifies, of opened account information, the communication terminal of the user who has requested account opening.

According to this example embodiment, since identity verification is performed by collation between the face image of the user included in the moving image and the face image of the identity verification document, collation between an instructed change of a face and a change of the face of the user, and verification of whether the identity verification document is authentic or fake, it is possible to readily and more reliably perform identity verification and input user information in opening an account from the terminal.

Third Example Embodiment

An information processing apparatus according to the third example embodiment of the present invention will be described next. The information processing apparatus according to this example embodiment is different from that according to the above-described second example embodiment in that liveness determination is performed not by the face of a user but by an identity verification document. The remaining components and operations are similar to those in the second example embodiment. Hence, the same reference numerals denote similar components and operations, and a detailed description thereof will be omitted. Note that when liveness determination according to this example embodiment is combined with liveness determination by the face of the user according to the second example embodiment or two liveness determination processes are performed simultaneously, it is possible to further improve the accuracy of user verification.

<<Overview of Operation of Liveness Determination Processing>>

Figure 12:
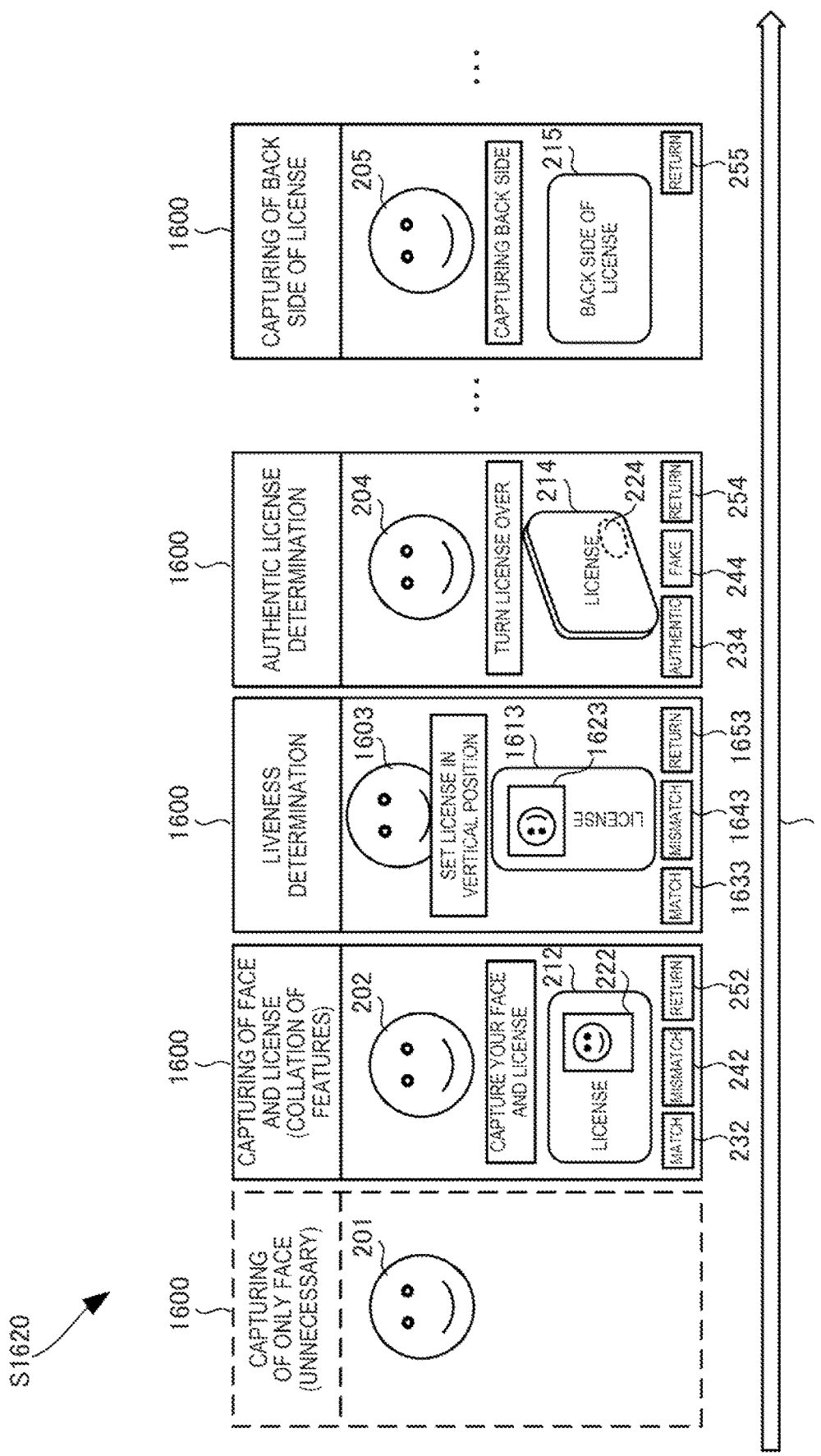
FIG. 12 is view showing an overview of the operation of identity verification processing by an information processing apparatus according to the third example embodiment of the present invention.

FIG. 12 is view showing an overview of the operation of identity verification processing (S1620) by an information processing apparatus 1600 according to this example embodiment. Note that FIG. 12 shows processing replacing the identity verification processing (S220) shown in FIG. 2A. Note also that in FIG. 12, the same reference numerals as in FIG. 2B denote similar components and a repetitive description thereof will be omitted.

In liveness determination of the identity verification processing (S1620), in response to a message "set license in vertical position" of a communication terminal, the user acts to set a license 1613 including a face image 1623 in the vertical direction without moving a face image 1603. In liveness determination, if the instruction of the message and the user action match each other, "match" 1633 is displayed; otherwise, "mismatch" 1643 is displayed. Note that during liveness determination as well, the face image 1603 and the license 1613 may be acquired simultaneously and held. Note also that this liveness determination processing is performed by the user action corresponding to the randomly selected instruction. However, to ensure liveness determination, it is desirable to perform liveness determination by user actions corresponding to a plurality of randomly selected instructions. If the "mismatch" 1643 is displayed, the user presses a return button 1653 to perform liveness determination again. If "mismatch" is displayed a predetermined number of times, non-liveness may be determined, thereby ending the processing. In this case, information held until now is discarded to restart the processing from authentication of a face image.

<<Functional Arrangement of Communication Terminal>>

Figure 13:
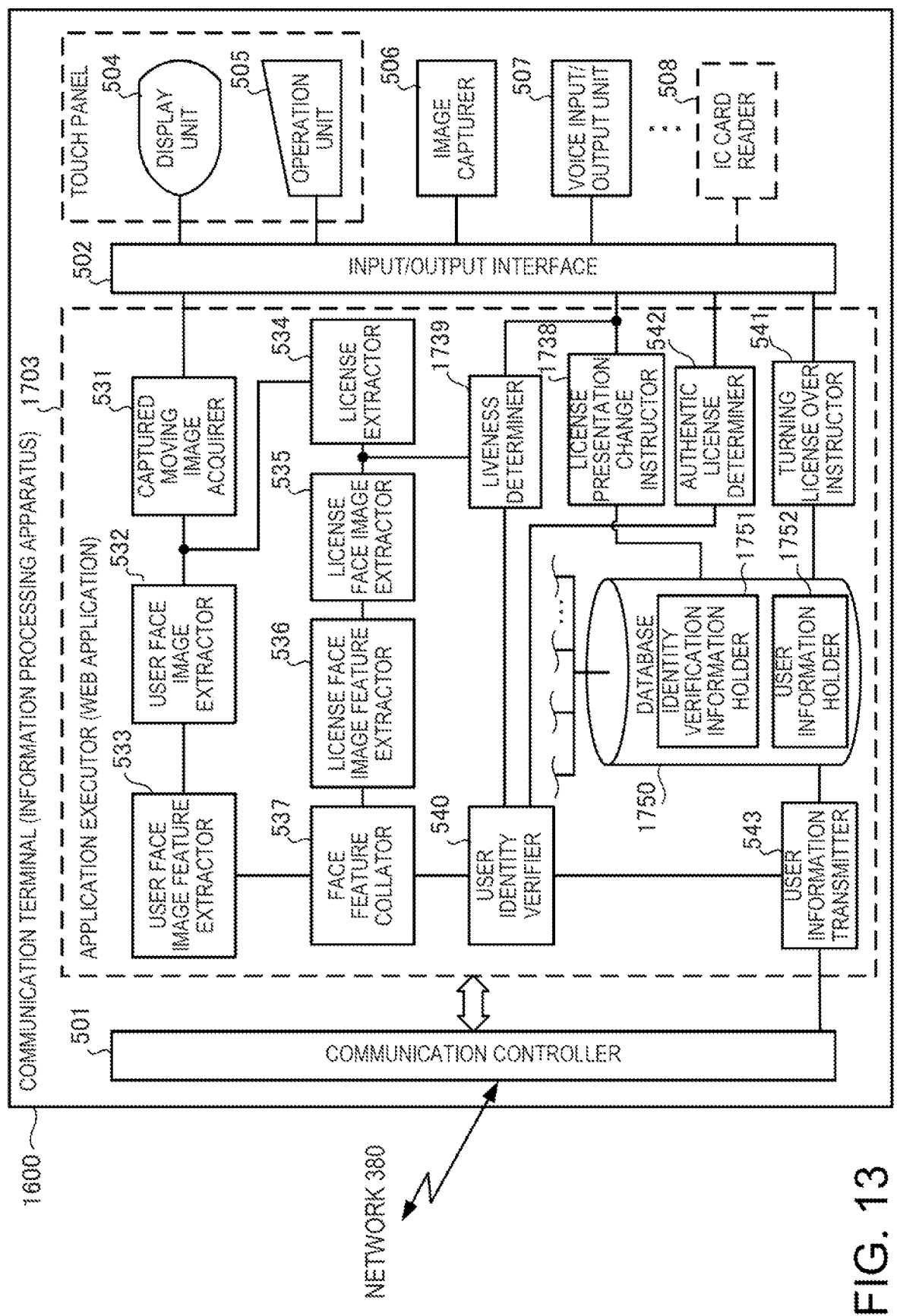
FIG. 13 is a block diagram showing the functional arrangement of a communication terminal as the information processing apparatus according to the third example embodiment of the present invention.

FIG. 13 is a block diagram showing the functional arrangement of the communication terminal as the information processing apparatus 1600 according to this example embodiment. Note that in FIG. 13, the same reference numerals as in FIG. 5 denote similar functional components and a repetitive description thereof will be omitted.

The communication terminal as the information processing apparatus 1600 includes an application executor 1703 instead of the application executor 503. The application executor 1703 includes a license presentation change instructor 1738, a liveness determiner 1739, and a database 1750. The license presentation change instructor 1738 and the liveness determiner 1739 correspond to the first determiner 104 shown in FIG. 1. Furthermore, the user identity verifier 540 may perform identity verification of the user based on the collation result of a face feature collator 537 and the determination result of the liveness determiner 1739 or further consider the determination result of an authentic license determiner 542.

For liveness determination, the license presentation change instructor 1738 instructs, by an output from a display unit 504 or a voice input/output unit 507, the user to perform an action of changing the license, which has been selected randomly. The liveness determiner 1739 collates the action instruction to change the license, which has been output by the license presentation change instructor 1738, with a change in license image obtained from a license extractor 534, and determines whether the change corresponds to the action instruction.

Figure 17:
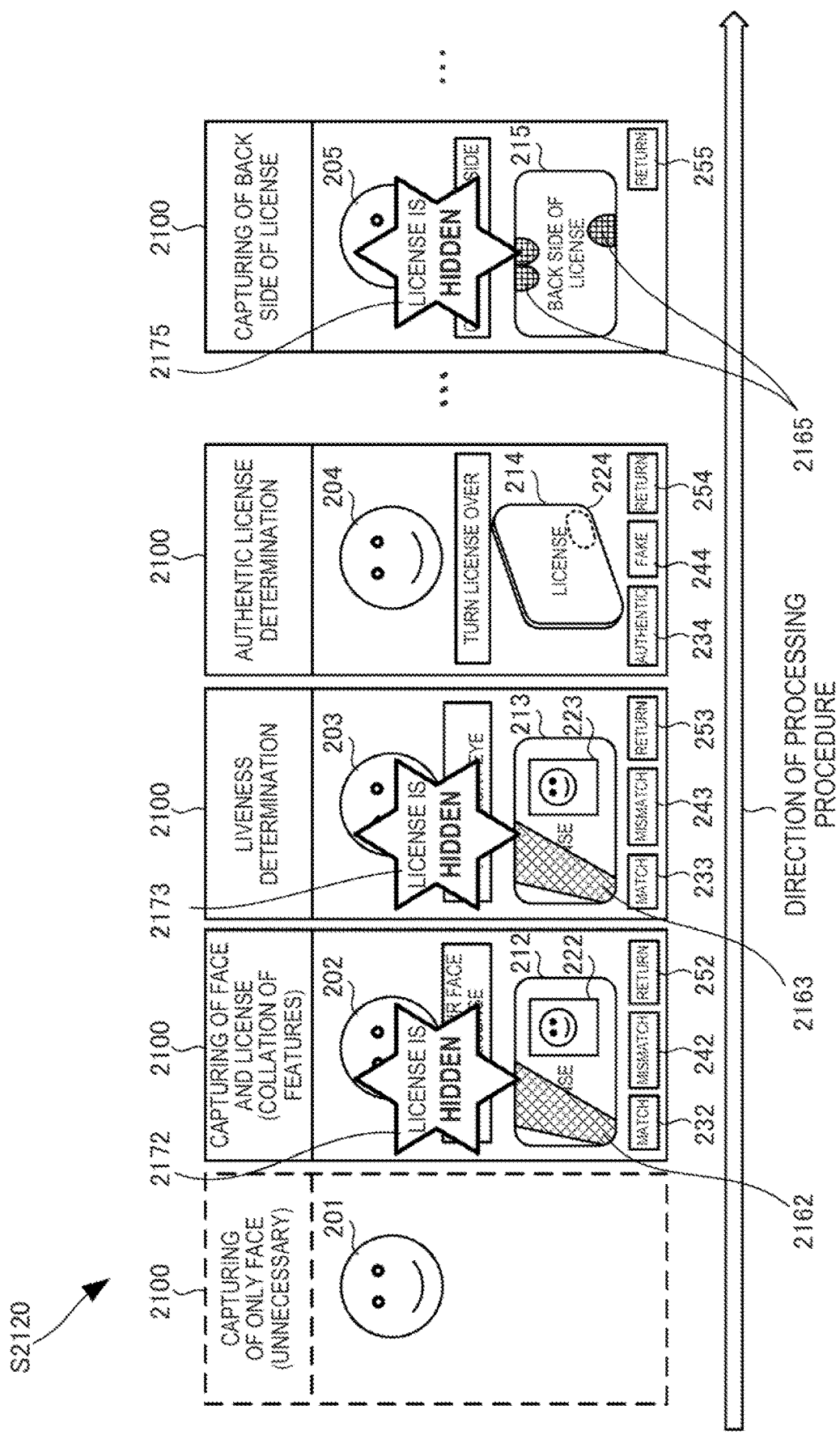
FIG. 17 is a view showing an overview of the operation of user information acquisition processing by an information processing apparatus according to the fourth example embodiment of the present invention.

The database 1750 includes an identity verification information holder 1751 and a user information holder 1752. The identity verification information holder 1751 saves various algorithms and parameters to be used for identity verification. The user information holder 1752 holds the moving image, the face images, the face features, and the front image/back image of the license, which are obtained during the identity verification processing. FIG. 17 does not illustrate lines connecting the database 1750 and related functional components in order to avoid complicatedness. However, identity verification information is sent from the identity verification information holder 1751 to each functional component that requires the information, and user information acquired by each functional component is held in the user information holder 1752.

(User Information Holder and Identity Verification Information Holder)

Figure 14:
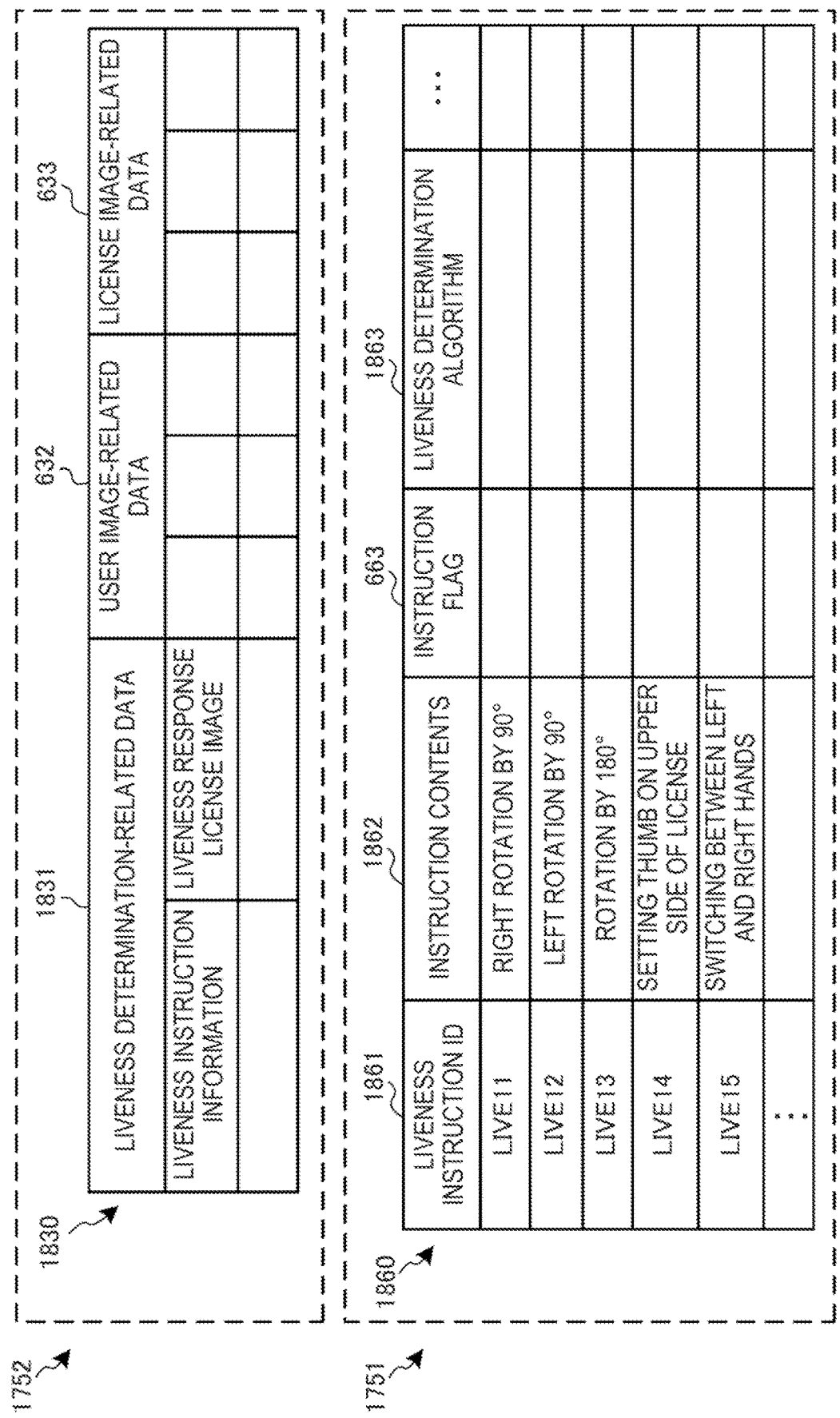
FIG. 14 is a view showing the structures of a user information holder and an identity verification information holder according to the third example embodiment of the present invention.

FIG. 14 is a view showing the structures of the user information holder 1752 and the identity verification information holder 1751 according to this example embodiment. Note that in FIG. 14, the same reference numerals as in FIGS. 6A and 6B denote similar components and a repetitive description thereof will be omitted.

In the user information holder 1752 shown in FIG. 14, a liveness-related data holder 1830 replaces the liveness-related data holder 630 shown in FIG. 6A and other holders 610, 620, and 640 are maintained. The liveness-related data holder 1830 holds, for example, liveness instruction information and liveness response license image as liveness determination-related data 1831.

In the identity verification information holder 1751 shown in FIG. 14, a liveness instruction information holder 1860 replaces the liveness instruction information holder 660 shown in FIG. 6B and other holders 660 and 670 are maintained. The liveness instruction information holder 1860 stores, in association with a liveness instruction ID 1861, instruction contents 1862, an instruction flag 663, and a liveness determination algorithm 1863. The instruction contents 1862 include, for example, right rotation by 90°, left rotation by 90°, rotation by 180°, setting the thumb on the upper side of the license, and switching between the left and right hands as changes in license presentation. In addition, whether to hold the upper and lower sides or the left and right sides of the license, the number of fingers, and the types of fingers are included.

(Liveness Determination Table)

FIG. 15 is a table showing the structure of a liveness determination table 1920 according to this example embodiment. Note that the liveness determination table 1920 is used by the liveness determiner 1739 to collate a license change instruction and a change of the license of the user with each other.

The liveness determination table 1920 stores, for example, a liveness response license image 1922 by each user and a match or mismatch flag 1923 in association with each of a plurality of liveness instructions 1921. Then, the liveness determination table 1920 stores a liveness determination result 1924 determined based on the plurality of match/mismatch flags 1923. Note that whether the liveness instruction 1921 and the liveness response license image 1922 match each other may be determined based on a threshold.

(Liveness Determination Processing)

Figure 16:
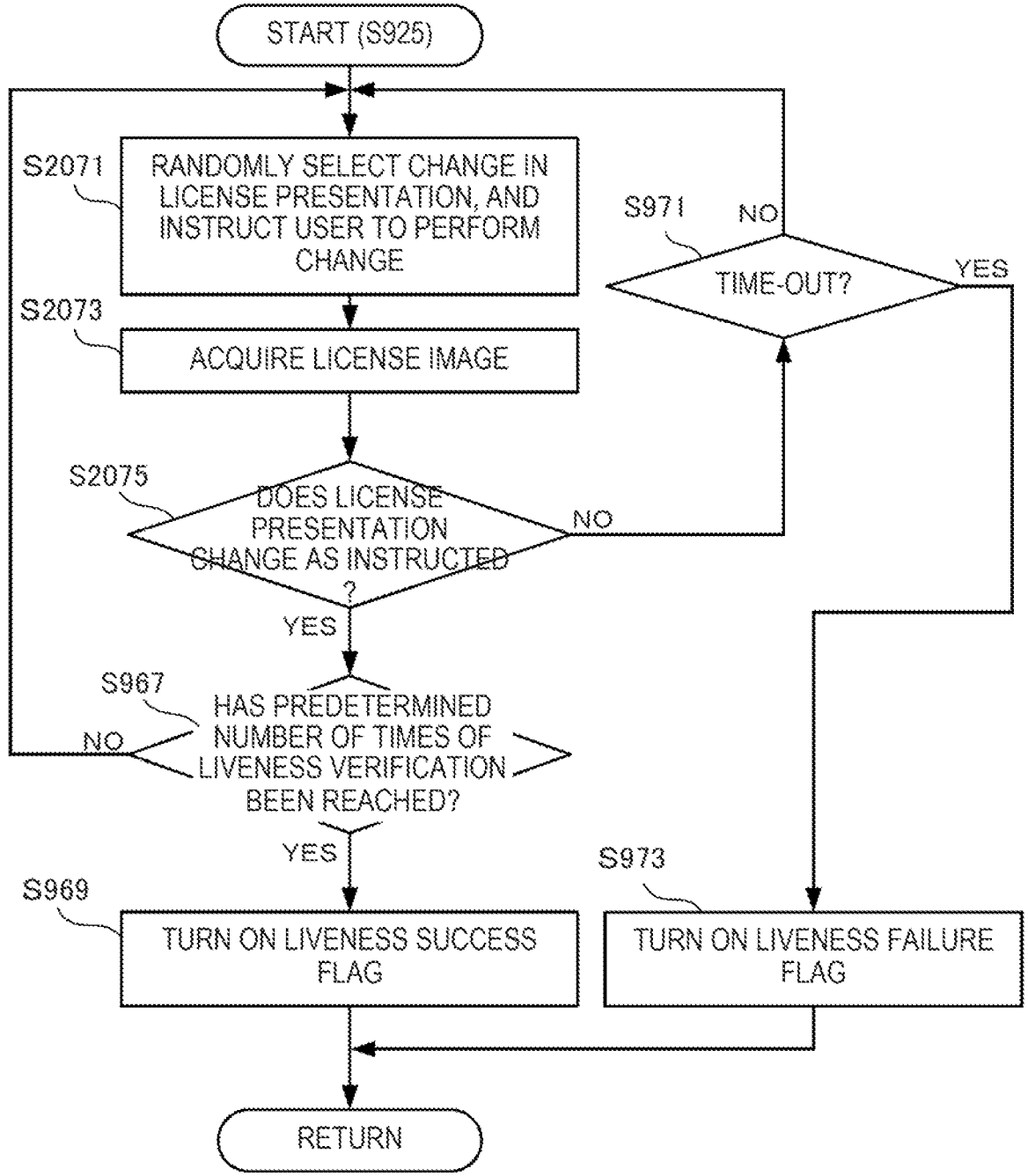
FIG. 16 is a flowchart illustrating the procedure of liveness determination processing according to the third example embodiment of the present invention.

FIG. 16 is a flowchart illustrating another procedure of the liveness determination processing (S925) according to this example embodiment. Note that in FIG. 16, the same step numbers as in FIG. 9D denote the same steps and a repetitive description thereof will be omitted. Only a change in the image of the license will be described with reference to FIG. 16. However, the present invention is not limited to this, and another change in license presentation is also included.

In step S2071, the information processing apparatus 1600 randomly selects a change in license presentation, and instructs the user to perform the change. In step S2073, the information processing apparatus 1600 extracts a license image from a moving image captured by an image capturer. In step S2075, the information processing apparatus 1600 determines whether the license image extracted in step S2073 corresponds to the instruction of the change in license presentation in step S2071.

Note that this example embodiment has particularly described the direction of the license as liveness determination on the license side. However, the present invention is not limited to the direction of the license, and an action that facilitates liveness determination and hardly imposes a load on the user, such as the way of holding the license of the user (including the position of a finger and the number of fingers) and a user action of presenting the license, may be possible.

According to this example embodiment, liveness determination can be implemented by an identity verification document instead of the face of the user. If this liveness determination processing is combined with liveness determination by the face of the user, it is possible to improve the accuracy of user verification.

Fourth Example Embodiment

An information processing apparatus according to the fourth example embodiment of the present invention will be described next. The information processing apparatus according to this example embodiment is different from those according to the above-described second and third example embodiments in that it is determined whether user information can be acquired from a license as an identity verification document, and if the user information cannot be acquired, the user information is acquired (captured) again. The remaining components and operations are similar to those in the second and third example embodiments. Hence, the same reference numerals denote similar components and operations, and a detailed description thereof will be omitted.

<<Overview of Operation of User Information Acquisition Processing>>

FIG. 17 is a view showing an overview of the operation of identity verification processing (S2120) by an information processing apparatus 2100 according to this example embodiment. Note that FIG. 17 shows processing replacing the identity verification processing (S220) shown in FIG. 2A. Note also that in FIG. 17, the same reference numerals as in FIG. 2B denote similar components and a repetitive description thereof will be omitted.

Referring to FIG. 17, part of a license in a moving image captured while the face image of the user and the face image of the license are collated with each other is not captured due to an obstacle 2162. In this case, even if the face images are collated with each other and match each other, it is impossible to acquire user information from the front image of the license reliably. In this example embodiment, if there is the obstacle 2162 covering the license, the user is notified of a message "license is hidden" 2172, and is instructed to capture again the front image of the license without the obstacle 2162. Furthermore, part of the license during liveness determination is not captured due to an obstacle 2163. In this case, even if liveness determination is OK, it is impossible to acquire user information from the front image of the license reliably. In this example embodiment, if there is the obstacle 2163, the user is notified of a message "license is hidden" 2173, and instructed to capture again the front image of the license without the obstacle 2163. In addition, part of the license while the back side of the license is captured is not captured due to obstacles (for example, fingers of the user or the like) 2165. In this case, it is impossible to acquire user information from the back image of the license reliably. In this example embodiment, if there are the obstacles 2165, the user is notified of a message "license is hidden" 2175, and instructed to capture again the back image of the license without the obstacles 2165.

<<Functional Arrangement of Communication Terminal>>

Figure 18:
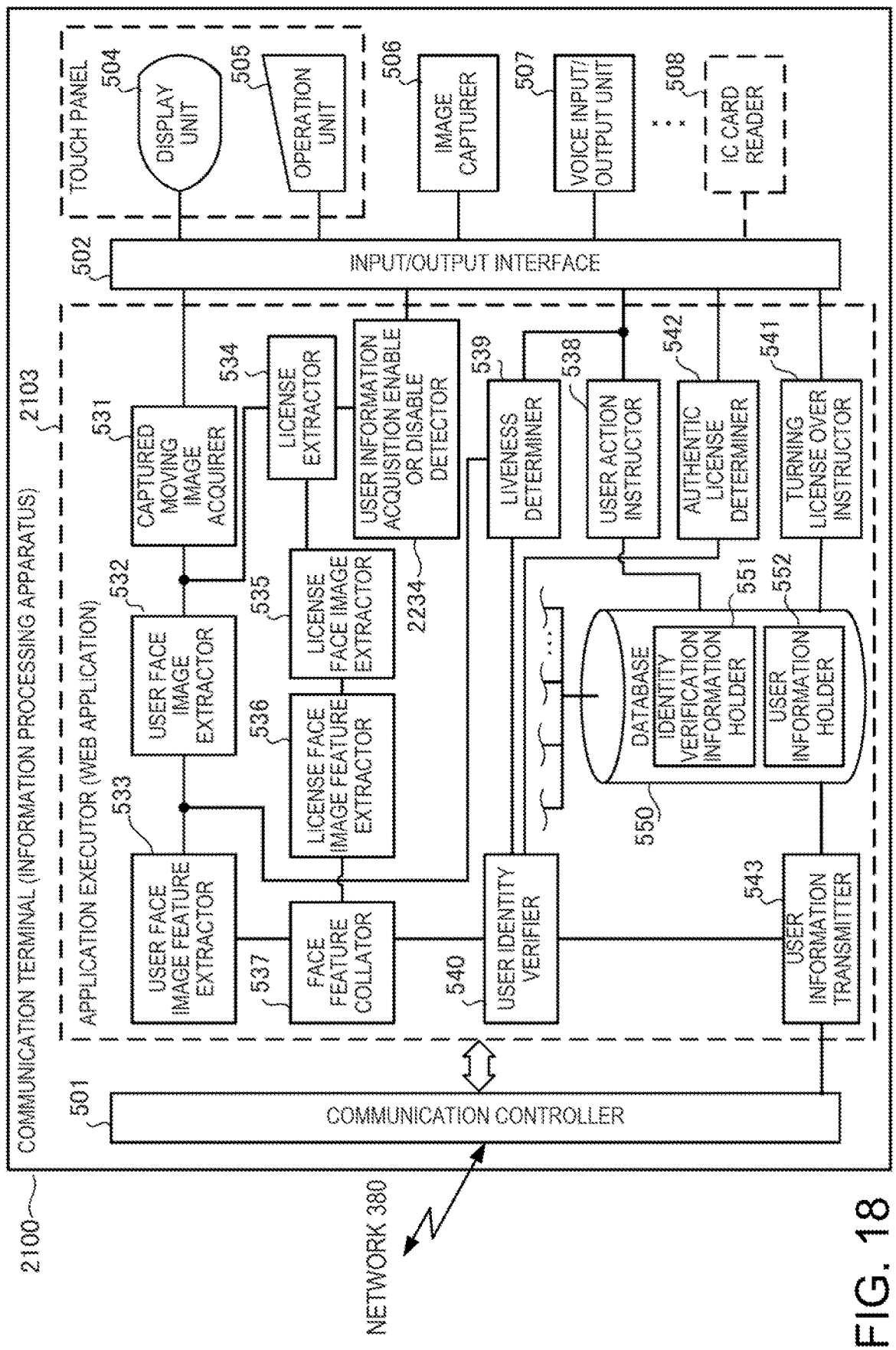
FIG. 18 is a block diagram showing the functional arrangement of a communication terminal as the information processing apparatus according to the fourth example embodiment of the present invention.

FIG. 18 is a block diagram showing the functional arrangement of the communication terminal as the information processing apparatus 2100 according to this example embodiment. Note that in FIG. 18, the same reference numerals as in FIG. 5 denote similar functional components and a repetitive description thereof will be omitted.

The information processing apparatus 2100 includes an application executor 2103. The application executor 2103 further includes a user information acquisition enable or disable detector 2234. The user information acquisition enable or disable detector 2234 determines whether it is possible to acquire user information, particularly, whether the front or back image of the license is acquired without any obstacle, and detects whether user information necessary for eligibility examination for account opening can be acquired or not. If it is detected that there is an obstacle and it is thus impossible to normally acquire the front or back image of the license, a request to capture again the front or back image of the license is made from a display unit 504 or a voice input/output unit 507.

(Identity Verification Processing)

Figure 19:
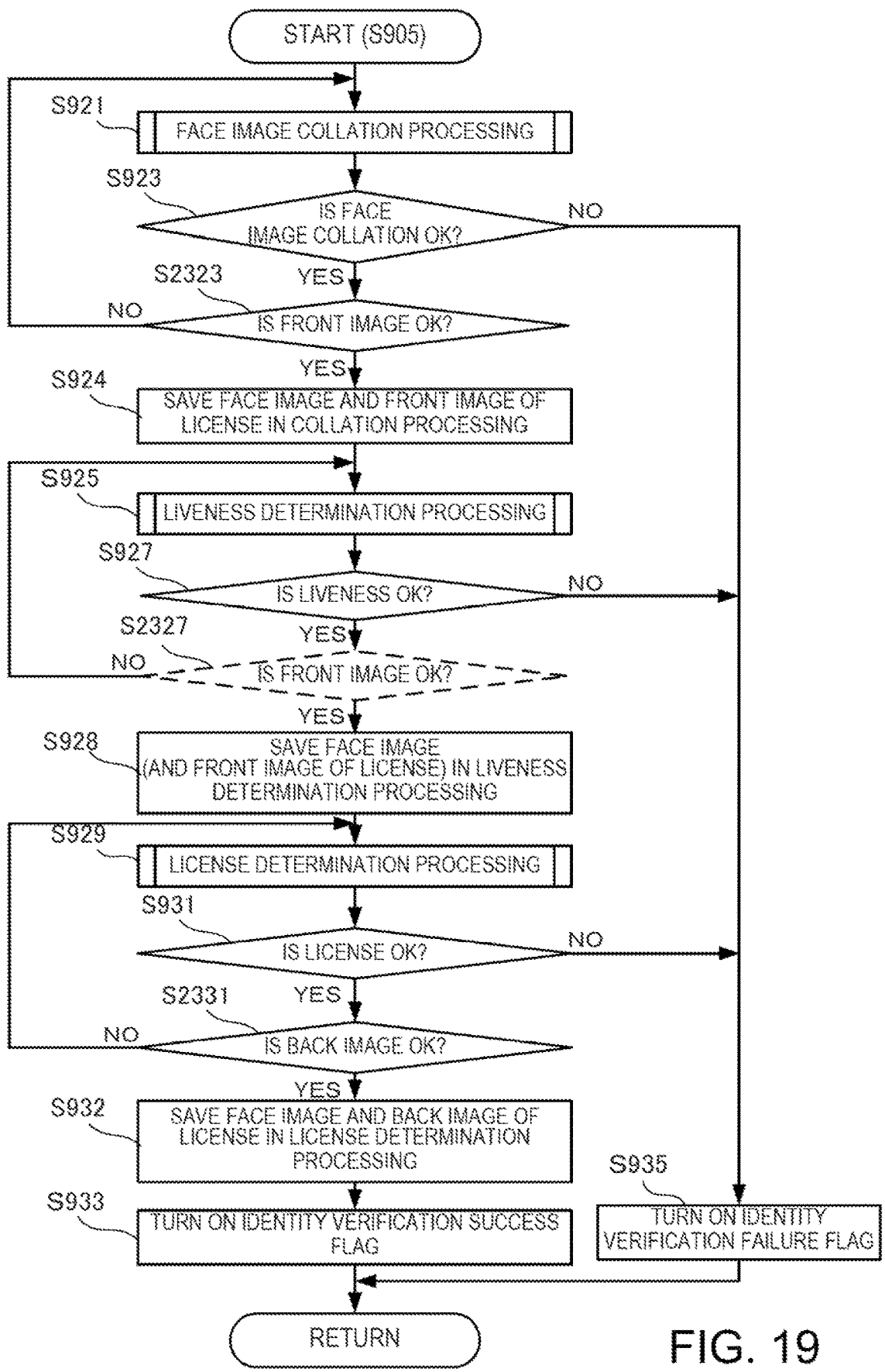
FIG. 19 is a flowchart illustrating the procedure of user information acquisition processing according to the fourth example embodiment of the present invention.

FIG. 19 is a flowchart illustrating still other procedure of the identity verification processing (S905) according to this example embodiment. Note that in FIG. 19, the same step numbers as in FIG. 9B denote the same steps and a repetitive description thereof will be omitted.

In step S2323, the information processing apparatus 2100 detects whether there is no obstacle in the front image of the license acquired from the moving image during face image collation processing to be able to acquire user information. If it is possible to acquire the user information, the information processing apparatus 2100 advances to step S924, and saves the front image of the license to acquire the user information to be used for eligibility examination; otherwise, the information processing apparatus 2100 returns to step S921, and captures again the front image of the license by the face image collation processing.

In step S2327, the information processing apparatus 2100 detects whether there is no obstacle in the front image of the license acquired from the moving image during liveness determination to be able to acquire user information. If it is possible to acquire the user information, the information processing apparatus 2100 advances to step S928, and saves the front image of the license to acquire the user information to be used for eligibility examination; otherwise, the information processing apparatus 2100 returns to step S925, and captures again the front image of the license by liveness determination processing. Note that if the front image of the license acquired from the moving image during liveness determination is not necessary for subsequent processing, step S2327 may be eliminated.

In step S2331, the information processing apparatus 2100 detects whether there is no obstacle in the back image of the license acquired from the moving image after license determination processing to be able to acquire user information. If it is possible to acquire the user information, the information processing apparatus 2100 advances to step S932, and saves the back image of the license to acquire the user information to be used for eligibility examination; otherwise, the information processing apparatus 2100 returns to step S929, and captures again the back image of the license by the license determination processing.

According to this example embodiment, it is possible to prevent in advance the lack of user information caused by an error in acquisition of image information of the identity verification document.

Fifth Example Embodiment

An information processing apparatus according to the fifth example embodiment of the present invention will be described next. The information processing apparatus according to this example embodiment is different from those according to the above-described second to fourth example embodiments in that instead of a license, a passport or individual number card including another face image is used as an identity verification document. The remaining components and operations are similar to those in the second to fourth example embodiments. Hence, the same reference numerals denote similar components and operations, and a detailed description thereof will be omitted.

<<Overview of Operation of Identity Verification Processing>>

Figure 20:
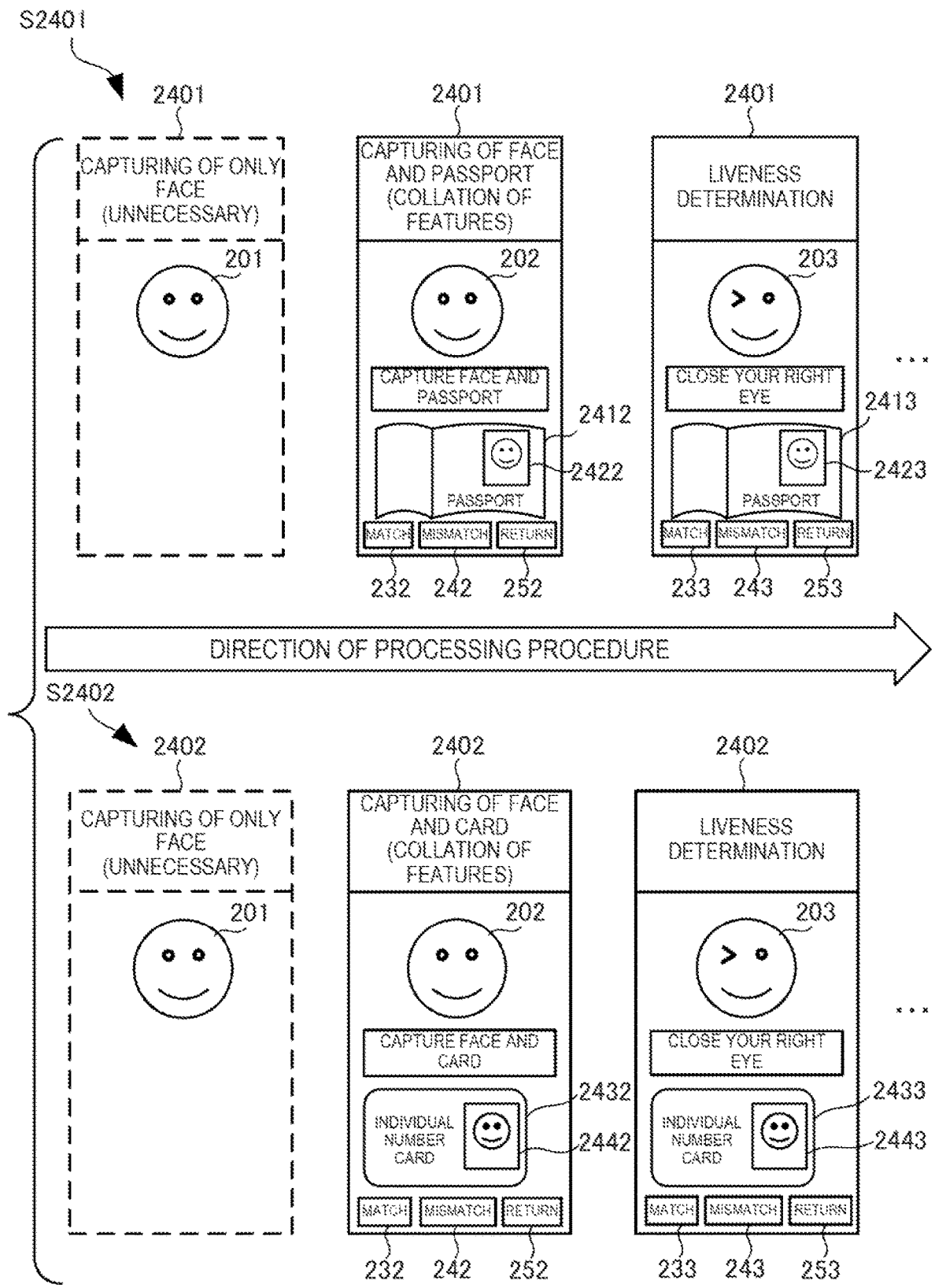
FIG. 20 is a view showing an overview of the operation of identity verification processing by an information processing apparatus according to the fifth example embodiment of the present invention.

FIG. 20 is a view showing an overview of the operation of identity verification processing (S2401 or S2402) by an information processing apparatus 2401 or 2402 according to this example embodiment. Note that FIG. shows processing replacing the identity verification processing (S220) shown in FIG. 2A. S2401 shows a case in which a passport is presented as an identity verification document, and S2402 shows a case in which an individual number card is presented. In FIG. 20, the same reference numerals as in FIG. 2B denote similar components and a repetitive description thereof will be omitted.

In step S2401, a passport 2412 including a face image 2422 is captured when a face image of the user is collated with the face image of the passport, and a passport 2413 including a face image 2423 is captured at the time of liveness determination. Note that since the passport includes no back side, an action of turning over the password need not be performed but a passport page including other user information may be presented.

In step S2402, an individual number card 2432 including a face image 2442 is captured when a face image of the user is collated with the face image of the individual number card, and an individual number card 2433 including a face image 2443 is captured at the time of liveness determination. Note that since the back side of the individual number card includes personal information, an action of turning over the individual number card need not be performed.

Note that this example embodiment has exemplified the passport and the individual number card as identity verification documents each used for identity verification. However, the present invention is not limited to them, and any identity verification document including a face image of the user and user information can be used.

According to this example embodiment, even if an identity verification document including another face image is used, it is possible to obtain the same effect as that for the license.

Sixth Example Embodiment

An information processing apparatus according to the sixth example embodiment of the present invention will be described next. The information processing apparatus according to this example embodiment is different from those according to the above-described second to fifth example embodiments in that a communication terminal as the information processing apparatus recognizes user information from an image of an identity verification document such as a license by OCR processing. The remaining components and operations are similar to those in the second to fifth example embodiments. Hence, the same reference numerals denote similar components and operations, and a detailed description thereof will be omitted. Note that character codes recognized by the OCR processing may further be analyzed, arranged in the format of the identity verification document, and then transmitted to an eligibility examination server. If the performance of the information processing apparatus is improved to solve the load problem, another processing related to account opening can be implemented by the communication terminal as the information processing apparatus.

<<Functional Arrangement of Communication Terminal>>

Figure 21:
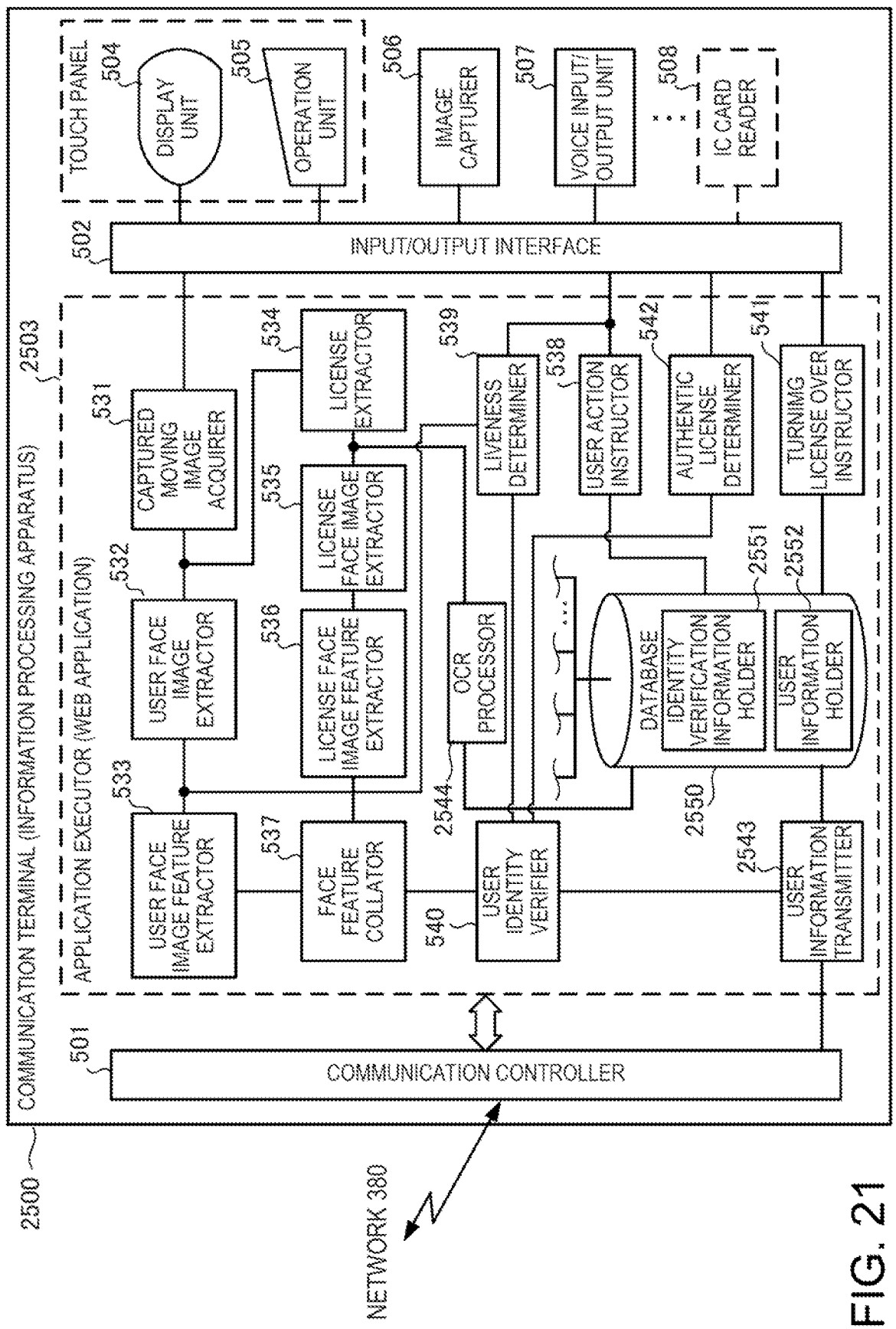
FIG. 21 is a block diagram showing the functional arrangement of a communication terminal as an information processing apparatus according to the sixth example embodiment of the present invention.

FIG. 21 is a block diagram showing the functional arrangement of a communication terminal as an information processing apparatus 2500 according to this example embodiment. Note that in FIG. 21, the same reference numerals as in FIG. 5 denote similar functional components and a repetitive description thereof will be omitted.

The communication terminal as the information processing apparatus 2500 includes an OCR processor 2544, a user information transmitter 2543, and a database 2550. The OCR processor 2544 performs OCR processing of the front or back image of a license extracted by a license extractor 534 from a moving image captured by an image capturer based on an OCR algorithm held in an identity verification information holder 2551 of the database 2550, thereby converting the image into user information by character codes. Then, the user information by the character codes of a conversion result is held in a user information holder 2552 of the database 2550. The user information transmitter 2543 transmits, to an eligibility examination server 360, the captured moving image and face image of the user and the user information by the character codes acquired from the license, which are held in the user information holder 2552.

The database 2550 includes the identity verification information holder 2551 and the user information holder 2552, and the identity verification information holder 2551 holds an OCR algorithm (not shown) in addition to an identity verification information holder 551 shown in FIG. 6B. Furthermore, the user information (not shown) by the character codes having undergone the OCR processing is held in the user information holder 2552 instead of the front or back image of the license in the user information holder 552 shown in FIG. 6A.

<<Processing Procedure of Communication Terminal>>

Figure 22:
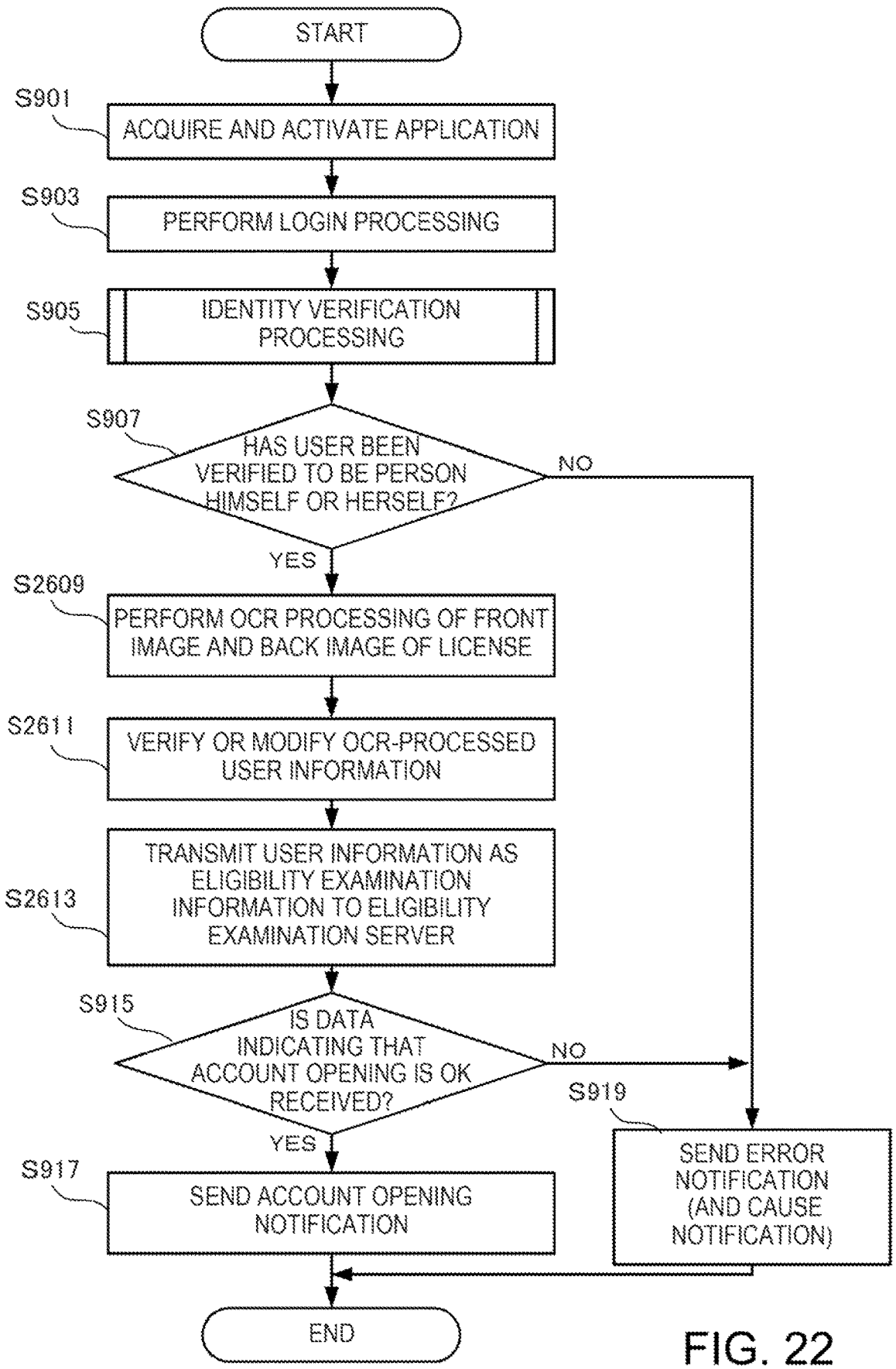
FIG. 22 is a flowchart illustrating the processing procedure of the communication terminal as the information processing apparatus according to the sixth example embodiment of the present invention.

FIG. 22 is a flowchart illustrating the processing procedure of the communication terminal as the information processing apparatus 2500 according to this example embodiment. Note that in FIG. 22, the same step numbers as in FIG. 9A denote the same steps and a repetitive description thereof will be omitted.

In step S2609, the information processing apparatus 2500 performs OCR processing of the front and back images of the license extracted from the moving image captured by the image capturer, thereby generating and reproducing user information by character codes. In step S2611, the information processing apparatus 2500 displays the user information having undergone the OCR processing on a display unit 504, and the user verifies or modifies the user information. In step S2613, the information processing apparatus 2500 transmits, to the eligibility examination server, as eligibility examination information, the user information verified or modified by the user together with the face image.

According to this example embodiment, it is possible to reduce a communication capacity to prevent communication traffic, as compared with transmission of image data, and reduce the load on the eligibility examination server or a bank account management server.

Seventh Example Embodiment

Information processing apparatus according to the seventh example embodiment of the present invention will be described next. The information processing apparatus according to this example embodiment is different from those according to the above-described second to sixth example embodiments in that an account is used instead of opening an account. The remaining components and operations are similar to those in the second to sixth example embodiments. Hence, the same reference numerals denote similar components and operations, and a detailed description thereof will be omitted. Note that in this example embodiment, an account use application is explained as an application different from an account opening application but may be provided as an integrated account processing application.

<<Overview of Account Use Operation>>

Figure 23:
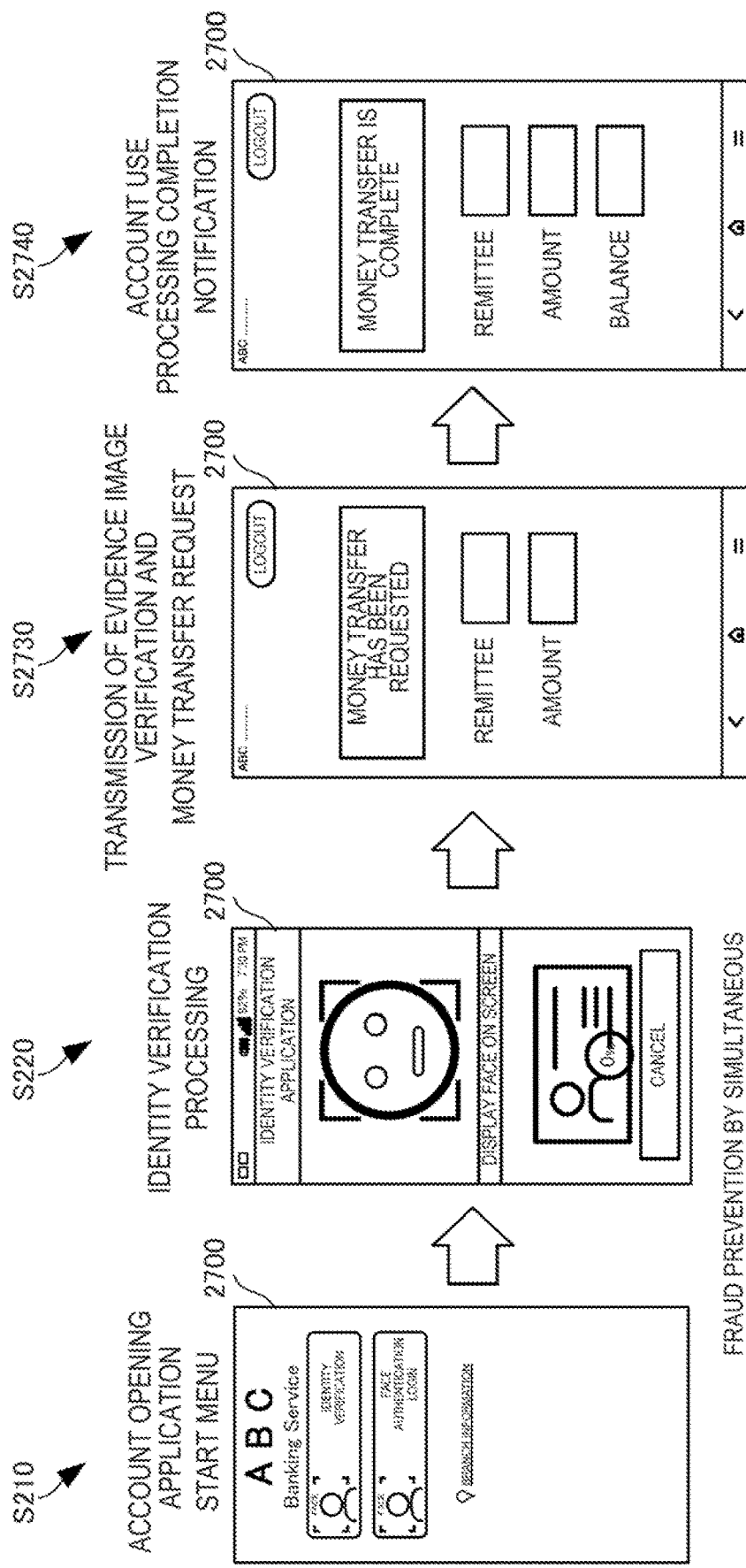
FIG. 23 is a view showing an overview of an account use operation by an information processing apparatus according to the seventh example embodiment of the present invention.

FIG. 23 is a view showing an overview of an account use operation by an information processing apparatus 2700 according to this example embodiment. Note that in FIG. 23, the same step numbers as in FIG. 2A denote the same steps and a repetitive description thereof will be omitted.

In FIG. 23, steps S210 and S220 are the same as in FIG. 2A. However, identity verification in step S220 has been performed once at the time of account opening, and thus a simplified procedure, as compared with FIG. 2A, is used while maintaining the reliability. Since, for example, a face image of the person himself or herself is already registered together with an account, processing of verifying whether the identity verification document is authentic and processing of acquiring a back image of the identity verification document can be skipped. Note that if a "specific transaction" defined by the Anti-Criminal Proceeds Act, such as a large cash transaction exceeding a predetermined amount, for example, 2 million yen, is targeted, identity verification in step S220 can be used.

In step S2730, the communication terminal as the information processing apparatus 2700 transmits, to a bank account management server 370, a money transfer request from the account of the user himself or herself instructed by the user, together with information of an identity verification processing result. Then, if the bank account management server 370 screens the money transfer request and sends a money transfer completion notification, the communication terminal as the information processing apparatus 2700 notifies, in step S2740, the user of the completion of money transfer. Note that if money transfer processing is not approved or money transfer processing fails, the user is notified of a money transfer error.

<<Operation Sequence of Account Use System>>

Figure 24:
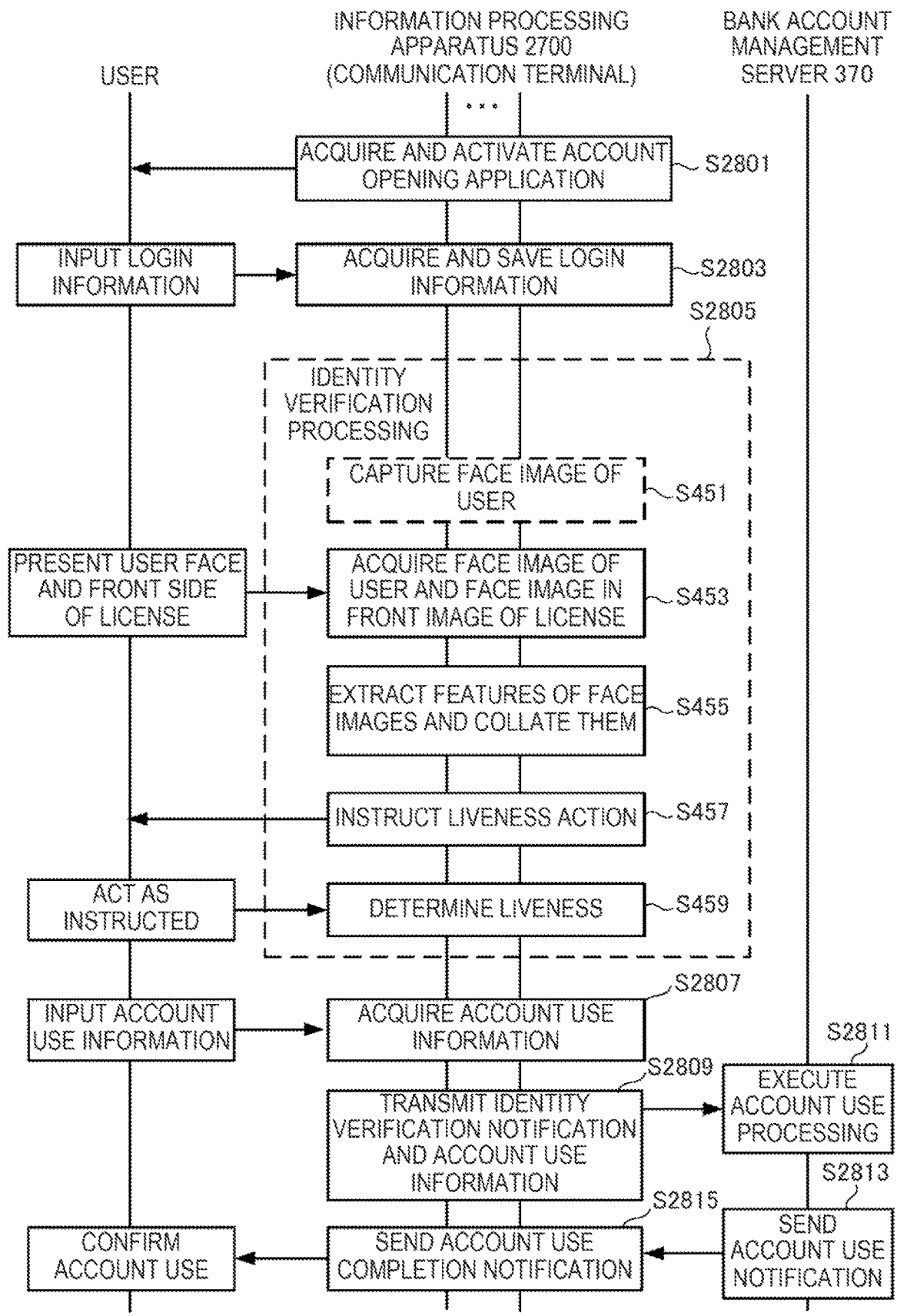
FIG. 24 is a sequence chart showing the operation procedure of an account use system including the information processing apparatus according to the seventh example embodiment of the present invention.

FIG. 24 is a sequence chart showing the operation procedure of an account use system including the information processing apparatus 2700 according to this example embodiment. Note that in FIG. 24, the same step numbers as in FIG. 4A denote the same steps and a repetitive description thereof will be omitted.

In step S2801, the communication terminal as the information processing apparatus 2700 acquires the account use application, and activates it. In step S2803, the communication terminal as the information processing apparatus 2700 acquires login information and other information input by the user and saves them.

In step S2805, the communication terminal as the information processing apparatus 2700 executes identity verification processing of the user only in the communication terminal as the information processing apparatus 2700 before transmitting user information for account use. In the processing in step S2805, steps S461 to S465 shown in FIG. 4A are not performed in normal account use. However, if, as described above, a "specific transaction" defined by the Anti-Criminal Proceeds Act, such as a large cash transaction exceeding the predetermined amount, for example, 2 million yen, is targeted, steps S461 to S465 shown in FIG. 4A may be executed.

If the identity verification processing of the user succeeds in step S2805, the communication terminal as the information processing apparatus 2700 acquires, in step S2807, account use information input by the user. Then, in step S2809, the communication terminal as the information processing apparatus 2700 transmits, to the bank account management server 370, the account use information together with the face image/moving image of the user and the front image of the license acquired and held by the information processing apparatus 2700 during the identity verification processing in step S2805. Note that if the "specific transaction" is targeted, eligibility examination by the eligibility examination server 360, as shown in S407 to S413 of FIG. 4B, may be performed.

In step S2811, the bank account management server 370 executes account use processing based on the user information and the account use information received from the information processing apparatus 2700. Upon completion of the account use processing, the bank account management server 370 transmits, in step S2813, an account use completion notification to the information processing apparatus 2700.

In step S2815, the communication terminal as the information processing apparatus 2700 notifies the user of the account use completion notification received from the bank account management server 370, thereby confirming account use.

<<Functional Arrangement of Communication Terminal>>

Figure 25:
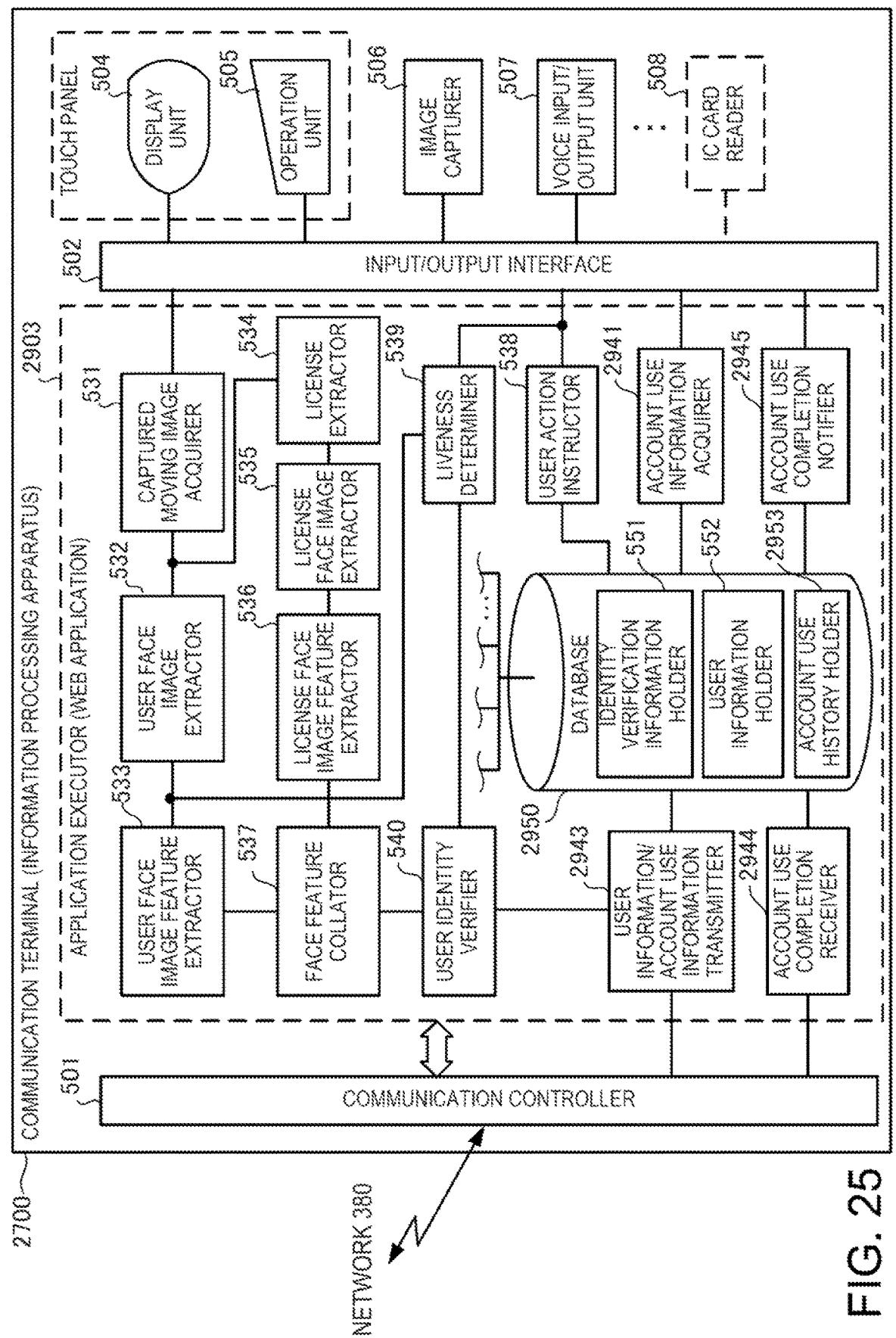
FIG. 25 is a block diagram showing the functional arrangement of a communication terminal as the information processing apparatus according to the seventh example embodiment of the present invention.

FIG. 25 is a block diagram showing the functional arrangement of the communication terminal as the information processing apparatus 2700 according to this example embodiment. Note that in FIG. 25, the same reference numerals as in FIG. 5 denote similar functional components and a repetitive description thereof will be omitted.

The communication terminal as the information processing apparatus 2700 includes an application executor 2903 that executes the account use application. The application executor 2903 includes an account use information acquirer 2941, a user information/account use information transmitter 2943, an account use completion receiver 2944, an account use completion notifier 2945, and a database 2950.

The account use information acquirer 2941 acquires account use information input and instructed by the user from an operation unit 505. The user information/account use information transmitter 2943 transmits, to the bank account management server 370, the account use information acquired by the account use information acquirer 2941, together with user information acquired during identity verification of the user. The account use completion receiver 2944 receives an account use processing result in the bank account management server 370. The account use completion notifier 2945 notifies, by a display unit 504 or a voice input/output unit 507, the user of the account use processing result received by the account use completion receiver 2944 from the bank account management server 370.

The database 2950 includes an account use history holder 2953. The account use history holder 2953 holds a history of account use by the user. Although not shown, the account use history holder 2953 desirably, confidentially holds a user ID, a time stamp, an account number, account use information, and the like.

Note that in this example embodiment, identity verification is performed at the time of account opening. Therefore, processing of determining whether the license is authentic and processing of capturing a back image of the license are not performed for the sake of simplicity of a user operation. Furthermore, at the time of account use, the face image and the feature held in the terminal at the time of account opening may be collated with the face image of the user captured by the image capturer and the feature without presenting the license, and liveness determination may be performed. Alternatively, a face image and a feature registered or updated in the bank account management server 370 may be acquired and collated with the face image of the user captured by the image capture and the feature, and liveness determination may be performed. As described above, at the time of account use, the user's labor is desirably omitted by simplifying the identity verification procedure, as compared with that at the time of account opening.

According to this example embodiment, at the time of account use as well, it is possible to readily, reliably perform identity verification and account use processing in the terminal.

Other Example Embodiments

Note that the example embodiments have exemplified the license, passport, and individual number card as identity verification documents. However, the present invention is applicable to another document including a face image of the user and user information used for user eligibility examination, and it is possible to obtain the same effects.

In addition, if the user registers Internet banking, it is possible to simplify authentic license determination and liveness determination, and advance to eligibility examination by collation between face images and collection of user information from the identity verification document (for the license, acquisition of front and back images).

Furthermore, by sharing an identity verification result of the user and a result of eligibility examination of the user for account opening using a blockchain, it is possible to use, in opening an account in another bank, information used at the time of opening an account in one bank. Therefore, it is possible to more readily and more reliably implement an account opening operation by the user.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described example embodiments can also be described as in the following supplementary notes but are not limited to the followings.

(Supplementary Note 1)

There is provided an information processing apparatus comprising:

a first feature extractor that extracts a first feature from a face image of a user included in a moving image;

a second feature extractor that extracts a second feature from a face image of an identity verification document for authenticating the user included in the moving image;

a first collator that collates whether the first feature and the second feature match each other;

a first determiner that instructs the user to perform a predetermined action, and determines whether an action of the user included in the moving image corresponds to the instructed predetermined action; and a verifier that verifies that the user is the person himself or herself, when the first feature and the second feature match each other and the action of the user included in the moving image corresponds to the instructed predetermined action.

(Supplementary Note 2)

There is provided the information processing apparatus according to supplementary note 1, wherein the face image of the user and the face image of the identity verification document for authenticating the user are images in the same frame of the moving image, and the collation by the first collator and the determination by the first determiner are processed in parallel to each other.

(Supplementary Note 3)

There is provided the information processing apparatus according to supplementary note 1, wherein when the first collator determines that the first feature and the second feature match each other, the determination by the first determiner is performed.

(Supplementary Note 4)

There is provided the information processing apparatus according to supplementary note 1, wherein when the first determiner determines that the action of the user included in the moving image corresponds to the instructed predetermined action, the collation by the first collator is performed.

(Supplementary Note 5)

There is provided the information processing apparatus according to any one of supplementary notes 1 to 4, wherein the action instructed to the user includes at least one of an action of a body of the user including a face of the user and a change in a method of presenting the identity verification document.

(Supplementary Note 6)

There is provided the information processing apparatus according to any one of supplementary notes 1 to 5, further comprising a second determiner that determines whether the identity verification document is authentic, wherein when the identity verification document is authentic, the verifier verifies that the user is the person himself or herself.

(Supplementary Note 7)

There is provided the information processing apparatus according to supplementary note 6, further comprising:

a third feature extractor that extracts a third feature from the face image of the user included in the moving image while determining the identity verification document; and a second collator that collates whether the first feature and the third feature match each other, wherein when the first feature and the third feature match each other, the second determiner determines that the identity verification document is authentic.

(Supplementary Note 8)

There is provided the information processing apparatus according to supplementary note 6 or 7, further comprising:

a fourth feature extractor that extracts, together with obtaining an image of a surface with no face image of the identity verification document, a fourth feature from the face image of the user included in the moving image;

a third collator that collates whether the first feature and the fourth feature match each other; and a third determiner that determines, when the first feature and the fourth feature match each other, that the image of the surface with no face image of the identity verification document is authentic.

(Supplementary Note 9)

There is provided the information processing apparatus according to supplementary note 8, further comprising:

a holder that holds the moving image, the face image of the user included in the moving image, and the image of the identity verification document included in the moving image; and a transmitter that transmits, to an apparatus that performs eligibility examination of the user, the moving image, the face image of the user included in the moving image, and the identity verification document included in the moving image held in the holder, as user information, when the user is the person himself or herself, the identity verification document is authentic, and the image of the surface with no face image of the identity verification document is authentic.

(Supplementary Note 10)

There is provided the information processing apparatus according to any one of supplementary notes 1 to 9, further comprising a converter that recognizes characters included in the image of the identity verification document included in the moving image and converts the characters into character codes.

(Supplementary Note 11)

There is provided the information processing apparatus according to any one of supplementary notes 1 to 10, wherein the information processing apparatus comprises a communication terminal.

(Supplementary Note 12)

There is provided the information processing apparatus according to any one of supplementary notes 1 to 11, wherein the identity verification document is one of a license, a passport, and an individual number card.

(Supplementary Note 13)

There is provided an information processing method comprising:

extracting a first feature from a face image of a user included in a moving image;

extracting a second feature from a face image of an identity verification document for authenticating the user included in the moving image;

collating whether the first feature and the second feature match each other;

instructing the user to perform a predetermined action, and determining whether an action of the user included in the moving image corresponds to the instructed predetermined action; and verifying that the user is the person himself or herself, when the first feature and the second feature match each other and the action of the user included in the moving image corresponds to the instructed predetermined action.

(Supplementary Note 14)

There is provided an information processing program for causing a computer to execute a method, comprising:

extracting a first feature from a face image of a user included in a moving image;

extracting a second feature from a face image of an identity verification document for authenticating the user included in the moving image;

collating whether the first feature and the second feature match each other;

instructing the user to perform a predetermined action, and determining whether an action of the user included in the moving image corresponds to the instructed predetermined action; and verifying that the user is the person himself or herself, when the first feature and the second feature match each other and the action of the user included in the moving image corresponds to the instructed predetermined action.

(Supplementary Note 15)

There is provided an account opening system comprising:

a collator that collates a first feature extracted from a face image of a user included in a moving image with a second feature extracted from a face image of an identity verification document for authenticating the user included in the moving image;

a first determiner that instructs the user to perform a predetermined action, and determines whether an action of the user included in the moving image corresponds to the instructed predetermined action;

a second determiner that determines whether the identity verification document is authentic;

a verifier that verifies that the user is the person himself or herself, when the first feature and the second feature match each other, the action of the user included in the moving image corresponds to the instructed predetermined action, and it is determined that the identity verification document is authentic;

a third determiner that determines, when a fourth feature extracted from the face image of the user included in the moving image, together with obtaining an image of a surface with no face image of the identity verification document, matches the first feature, that the image of the surface with no face image of the identity verification document is authentic;

an eligibility examiner that examines eligibility of the user based on comparison between information registered in advance with the face image of the user included in the moving image and contents of the identity verification document obtained by recognizing characters from the image of the identity verification document included in the moving image and converting the characters into character codes, when the user is the person himself or herself, the identity verification document is authentic, and the image of the surface including no face image of the identity verification document is authentic; and an account opening unit that opens an account for the user determined to be eligible.

(Supplementary Note 16)

There is provided an account opening method comprising:

collating a first feature extracted from a face image of a user included in a moving image with a second feature extracted from a face image of an identity verification document for authenticating the user included in the moving image;

instructing the user to perform a predetermined action, and determining whether an action of the user included in the moving image corresponds to the instructed predetermined action;

determining whether the identity verification document is authentic;

verifying that the user is the person himself or herself, when the first feature and the second feature match each other, the action of the user included in the moving image corresponds to the instructed predetermined action, and it is determined that the identity verification document is authentic;

determining, when a fourth feature extracted from the face image of the user included in the moving image, together with obtaining an image of a surface with no face image of the identity verification document, matches the first feature, that the image of the surface with no face image of the identity verification document is authentic;

examining eligibility of the user based on comparison between information registered in advance with the face image of the user included in the moving image and contents of the identity verification document obtained by recognizing characters from the image of the identity verification document included in the moving image and converting the characters into character codes, when the user is the person himself or herself, the identity verification document is authentic, and the image of the surface with no face image of the identity verification document is authentic; and opening an account for the user determined to be eligible.

The invention claimed is:

1. An information processing apparatus comprising:
a camera configured to capture a moving image;
a hardware memory configured to store instructions; and
a processor configured to execute the instructions to:
  display a face image of a user, an identity verification document image and a message on a display, wherein the face image of the user and the identity verification document image are included in the moving image, and wherein the message is for instructing the user to perform an action;
  extract a first feature from the face image of the user included in the moving image;
  extract a second feature from a face image in the identity verification document image included in the moving image;
  determine whether the first feature and the second feature match each other;
  determine whether an action of the user included in the moving image corresponds to the instructed action by the message on the display; and
  verify the user is the person himself or herself, when it is determined that the first feature and the second feature match each other and the action of the user included in the moving image corresponds to the instructed action.

2. The information processing apparatus according to claim 1, wherein the face image of the user, the identity verification document image and the message are displayed vertically on the display.

3. The information processing apparatus according to claim 1, wherein the face image of the user, the identity verification document image and the message are displayed at the same time on the display.

4. The information processing apparatus according to claim 1, wherein the processor is configured to display the massage message for instructing the user to perform the action on the display, when determining that the first feature and the second feature match each other, and determine whether the action of the user included in the moving image corresponds to the instructed action by the message on the display.

5. The information processing apparatus according to claim 1, wherein the processor is configured to determine whether the first feature and the second feature match each other, when displaying the message and determining that the action of the user included in the moving image corresponds to the instructed action by the message on the display.

6. The information processing apparatus according to claim 1, wherein the action instructed to the user includes at least one of an action of a body of the user including a face of the user and a change in a method of presenting the identity verification document.

7. The information processing apparatus according to claim 1, wherein the processor is further configured to execute the instructions to:
determine whether the identity verification document is authentic, and verify the user is the person himself or herself, when it is determined that the identity verification document is authentic.

8. The information processing apparatus according to claim 1, wherein the processor is further configured to execute the instructions to:
hold the moving image, the face image of the user included in the moving image, and the identity verification document image included in the moving image; and
transmit, to an apparatus, the moving image, the face image of the user included in the moving image, and the identity verification document image included in the moving image when verifying the user is the person himself or herself.

9. An information processing method performed by a computer and comprising:
displaying a face image of a user, an identity verification document image and a message on a display, wherein the face image of the user and the identity verification document image are included in a moving image, and wherein the message is for instructing the user to perform an action;

extracting a first feature from the face image of the user included in the moving image;

extracting a second feature from a face image in the identity verification document image included in the moving image;

determining whether the first feature and the second feature match each other;

determining whether an action of the user included in the moving image corresponds to the instructed action by the message on the display; and verifying the user is the person himself or herself, when it is determined that the first feature and the second feature match each other and the action of the user included in the moving image corresponds to the instructed action.

10. A non-transitory computer-readable storage medium storing a program, which causes a computer to execute a method, the method comprising:

displaying a face image of a user, an identity verification document image and a message on a display, wherein the face image of the user and the identity verification document image are included in a moving image, and wherein the message is for instructing the user to perform an action;

extracting a first feature from the face image of the user included in the moving image;

extracting a second feature from a face image in the identity verification document image included in the moving image;

determining whether the first feature and the second feature match each other;

determining whether an action of the user included in the moving image corresponds to the instructed action by the message on the display; and verifying the user is the person himself or herself, when it is determined that the first feature and the second feature match each other and the action of the user included in the moving image corresponds to the instructed action.

* * * * *